US012755174B2

(12) United States Patent
Layden et al.

(10) Patent No.: US 12,755,174 B2
(45) Date of Patent: Oct. 6, 2026

(54) QUANTUM-CLASSICAL MARKOV CHAIN MONTE CARLO

(71) Applicant: INTERNATIONAL BUSINESS MACHINES CORPORATION, Armonk, NY (US)

(72) Inventors: David Layden, San Jose, CA (US); Pawel Wocjan, Oviedo, FL (US); Ryan Victor Mishmash, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1238 days.

(21) Appl. No.: 17/699,041

(22) Filed: Mar. 18, 2022

(65) Prior Publication Data

US 2023/0297865 A1 Sep. 21, 2023

(51) Int. Cl.
*G06N 10/20* (2022.01)
*G06N 10/80* (2022.01)

(52) U.S. Cl.
CPC ............. *G06N 10/20* (2022.01); *G06N 10/80* (2022.01)

(58) Field of Classification Search
CPC ............................... G06N 10/20; G06N 10/80
See application file for complete search history.

(56) References Cited

U.S. PATENT DOCUMENTS 11,163,532 B2 11/2021 Montgomery et al.
2018/0157775 A1* 6/2018 Ronagh .................. G06F 30/20
2018/0196780 A1* 7/2018 Amin .................... H04L 9/0852
2018/0218281 A1* 8/2018 Reinhardt ............. G06N 10/70
2019/0019101 A1 1/2019 Neven
2020/0042882 A1* 2/2020 Liu ......................... G06F 17/18
2020/0090072 A1* 3/2020 Troyer .................. G06N 10/60
(Continued)

OTHER PUBLICATIONS

NPL: Temme et al., “Quantum Metropolis Sampling.” (2010) (Year: 2010).*
(Continued)

*Primary Examiner* — Li B. Zhen
*Assistant Examiner* — Sadik A Alshahari
(74) *Attorney, Agent, or Firm* — Amin, Turocy & Watson, LLP

(57) ABSTRACT

A system and a method of sampling from a probability distribution approximating a Boltzmann distribution of an n-spin Ising model includes receiving, by a classical computer, coupling coefficients for spin-spin interactions, field coefficients local to each spin, and a temperature for the n-spin Ising model; selecting a first n-spin configuration; preparing a first n-qubit state on a quantum computer associated with the first n-spin configuration; applying a unitary operator to the first n-qubit state resulting in a second n-qubit state; measuring the second n-qubit state to identify a corresponding second n-spin configuration; calculating, on the classical computer, an acceptance probability to determine whether to replace the first n-spin configuration with the second n-spin configuration or to keep the first n-spin configuration to obtain an output n-spin configuration; and repeating the preparing, applying, measuring and calculating until the output n-spin configuration is sufficiently close to the Boltzmann distribution.

20 Claims, 9 Drawing Sheets

(56) References Cited

U.S. PATENT DOCUMENTS

| | | | | |
|---|---|---|---|---|
| 2020/0134502 | A1* | 4/2020 | Anschuetz | G06F 17/18 |
| 2021/0174236 | A1* | 6/2021 | Babbush | G06F 15/16 |
| 2022/0092152 | A1* | 3/2022 | Hamze | G06F 17/18 |
| 2022/0114470 | A1* | 4/2022 | Kushibe | G06N 5/01 |
| 2022/0207402 | A1* | 6/2022 | Lechner | G06N 10/40 |
| 2022/0391741 | A1* | 12/2022 | McMahon | G06N 10/20 |
| 2022/0391743 | A1* | 12/2022 | Wild | G06N 10/60 |

OTHER PUBLICATIONS

Guglielmo Mazzola, "Sampling, rates, and reaction currents through reverse stochastic quantization on quantum computers", arXiv, Aug. 25, 2021, doi: https://doi.org/10.48550/arXiv.2108.11410.

Kechedzhi et al., "Efficient population transfer via non-ergodic extended states in quantum spin glass", Jul. 12, 2018, 16 pages, doi: https://doi.org/10.48550/arXiv.1807.04792.

Sanders et al., "Compilation of Fault-Tolerant Quantum Heuristics for Combinatorial Optimization", arXiv, Aug. 5, 2020, 77 pages, doi: https://doi.org/10.48550/arXiv.2007.07391.

T. L. Patti et al., "Markov Chain Monte-Carlo Enhanced Variational Quantum Algorithms," arXiv preprint, Feb. 1, 2021, 9 pages, doi: https://doi.org/10.48550/arXiv.2112.02190.

V. N. Smelyanskiy et al., "Intermittency of dynamical phases in a quantum spin glass", arXiv, Jul. 2, 2019, 16 pages, doi: https://doi.org/10.48550/arXiv.1907.01609.

V. N. Smelyanskiy et al., "Nonergodic Delocalized States for Efficient Population Transfer within a Narrow Band of the Energy Landscape", Physical Review X, Jan. 24, 2020, 51 pages, doi: https://doi.org/10.1103/PhysRevX.10.011017.

* cited by examiner

QUANTUM-CLASSICAL MARKOV CHAIN MONTE CARLO

BACKGROUND

The currently claimed embodiments of the present invention relate to quantum computation, and more specifically, to methods and systems of providing samples from a distribution approximating a Boltzmann distribution of an n-bit Ising model.

Quantum computers promise to solve certain computational problems much faster than classical computers. However, current quantum processors are to a certain extent limited by their modest size and appreciable error rates. Recent efforts to demonstrate quantum speedups have therefore focused on problems that are both classically hard and naturally suited to current quantum devices, like sampling from complicated—though not explicitly useful—probability distributions.

SUMMARY

An aspect of the present invention is to provide a method of sampling from a probability distribution approximating a Boltzmann distribution of an n-spin Ising model. The method includes receiving, by a classical computer, coupling coefficients for spin-spin interactions between spins pairs of n ordered spins, field coefficients local to each spin and a temperature for the n-spin Ising model, the n-spin Ising model having an energy associated with each configuration of n ordered spins; selecting, by the classical computer, a first n-spin configuration of the n ordered spins; preparing a first n-qubit state on the quantum computer that is associated with the selected first n-spin configuration, wherein each n-qubit state is associated with a unique one n-spin configuration of the n ordered spins; applying a unitary operator, by the quantum computer, to the selected first n-qubit state resulting in an evolved second n-qubit state; measuring, by the quantum computer, the evolved second n-qubit state to identify a corresponding second n-spin configuration; calculating, on the classical computer, an acceptance probability to determine whether to replace the selected first n-spin configuration with the second n-spin configuration corresponding to the evolved second n-qubit state or whether to keep the selected first n-spin configuration unmodified by the applying the unitary operator to obtain an output n-spin configuration; and repeating the preparing, the applying, the measuring and the calculating until the output n-spin configuration is sufficiently close to the Boltzmann distribution of the n-spin Ising model.

In an embodiment, the Boltzmann distribution of an n-spin Ising model is defined by a temperature T, a function $$E(x) = -\sum\nolimits_{k>j=1}^{n} J_{jk} x_j x_k - \sum\nolimits_{j=1}^{n} h_j x_j$$

that assigns an energy value to every n-bit state $x=(\pm 1, \ldots, \pm 1)$ where $J_{jk}$ and $h_j$ are coupling and field coefficients respectively, and where the Boltzmann distribution assigns a probability $$\mu_x = \mathcal{Z}^{-1} e^{-\frac{E(x)}{T}}$$

to each n-bit state x where $\mathcal{Z}$ =is a normalizing coefficient.

In an embodiment, preparing the n-qubit state on the quantum computer that is associated with the selected first n-spin configuration includes selecting the first n-qubit state encoding the input n-bit state x in the quantum computational basis; measuring, by the quantum computer, the evolved second n-qubit state to identify the corresponding one of the n-spin configurations includes measuring, by the quantum computer in the quantum computational basis, a second n-bit state y; applying a unitary operator, by the quantum computer, to the selected first n-qubit state resulting in an evolved second n-qubit state includes implementing a quantum channel $C_E$, using the quantum computer, which defines a proposal probability $q_{yx}$ of proposing the second n-bit state in the quantum computational basis y starting with the first n-qubit state encoding the input n-bit state x in the quantum computational basis that is equal to a proposal probability $q_{xy}$ of proposing the first n-bit state in the quantum computational basis state x starting with the second n-qubit state encoding the n-bit state y in the quantum computational basis, such that the ratio of the proposal probability $q_{yx}$ to the proposal probability $q_{xy}$ is equal to one.

In an embodiment, calculating, on the classical computer, the acceptance probability to determine whether to replace the input n-bit state with the output n-bit state or whether to keep the input n-bit state unmodified by the applying includes calculating, using the classical computer, an acceptance probability $A_{yx}$ that depends on the ratio of the proposal probability $q_{yx}$ to the proposal probability $q_{xy}$.

In an embodiment, implementing the quantum channel $C_E$ for which $q_{xy}$ equals $q_{yx}$ for all n-bit states x and y, using the quantum computer includes implementing Hamiltonian dynamics through an analog or a digital quantum simulation, using the quantum computer, which defines the proposal probability $q_{yx}$ and the proposal probability $q_{xy}$.

In an embodiment, implementing Hamiltonian dynamics, using the quantum computer, includes evolving a quantum state by a Hamiltonian in the form $H(\theta)=(1-\theta)\alpha H_E+\theta H_{mix}$, for $\theta$ selected within the interval from zero to one and an arbitrary scaling parameter $\alpha$, wherein:

$$H_E = \sum\nolimits_x E(x)|x\rangle\langle x| = -\sum\nolimits_{k>j=1}^{n} J_{jk} Z_j Z_k - \sum\nolimits_{j=1}^{n} h_j Z_j.$$

which depends on specified parameters $\{J_{jk}\}$, $\{h_j\}$, wherein $\{J_{jk}\}$, $\{h_j\}$ are, respectively, the coupling coefficients and field coefficients, wherein $Z_j$ and $Z_k$ are respectively Pauli $\sigma_z$ (sigma-z) matrices on qubits j and k, and $H_{mix}=\Sigma_P c_P P$, where $c_P$ are arbitrary real numbers and each P is a matrix from the set formed by arbitrary products of one or more of $X_j$ or $Y_j Y_k$, where $X_j$ is a Pauli $\sigma_x$ (sigma-x) matrix on qubit j, and where $Y_j$ and $Y_k$ are Pauli $\sigma_y$ (sigma-y) matrices on qubits j and k respectively, so that $\langle y|H_{mix}|x\rangle \in \mathbb{R}$ for all n-bit states x and y.

In an embodiment, implementing Hamiltonian dynamics includes applying an evolution by the Hamiltonian $H(\theta)$ with time t for fixed values of $\theta$. In an embodiment, computing, using the classical computer, an acceptance probability $A_{yx}$ includes computing the acceptance probability $A_{yx}$ using a same value $\theta$ and time t.

In an embodiment, calculating, using the classical computer, an acceptance probability $A_{yx}$ includes calculating the acceptance probability $A_{yx}$ using different values θ and time t selected at random for each jump from pre-determined distributions.

In an embodiment, implementing Hamiltonian dynamics includes performing a quantum measurement in the eigenbasis of the Hamiltonian H(θ) for fixed values of θ.

In an embodiment, performing the quantum measurement in the eigenbasis of the Hamiltonian H(θ) for fixed values of θ includes performing a quantum phase estimation algorithm on the quantum computer using controlled exp[−iH(θ)τ]-like gates through analog or digital quantum simulation, wherein T represents time.

In an embodiment, implementing Hamiltonian dynamics includes applying a nearly-adiabatic evolution by the Hamiltonian H(θ) with time varying θ.

In an embodiment, applying a nearly-adiabatic evolution by the Hamiltonian H(θ) with time varying θ includes applying a nearly-adiabatic evolution by the Hamiltonian H(θ) using a reverse quantum annealing procedure, wherein θ initially equals 0 and is slowly increased to some value of at most 1, then slowly decreased back to 0 in a symmetric manner.

In an embodiment, calculating the acceptance probability $A_{yx}$ includes calculating, using the classical computer, coefficients $\alpha_{yx}$, wherein $$\alpha_{yx} = \frac{e^{\frac{[E(x)-E(y)]}{T}} q_{xy}}{q_{yx}} = e^{\frac{[E(x)-E(y)]}{T}},$$

wherein the acceptance probability satisfies $1 \geq A_{yx} = \alpha_{yx} A_{xy} > 0$ to guarantee detailed balance, for instance $A_{yx} = \min(1, \alpha_{yx})$ which gives a Metropolis-Hastings algorithm, or $$A_{yx} = \left(1 + \frac{1}{\alpha_{yx}}\right)^{-1}$$

which gives a Glauber dynamics/Gibbs sampler algorithm, wherein E(x) corresponds to an energy value in the Ising model of the first n-bit state x and E(y) corresponds to an energy value in the Ising model of the second n-bit state y, and T corresponds to the selected temperature.

In an embodiment, repeating the preparing, the applying, the measuring and the calculating includes preparing another n-qubit state on the quantum computer, wherein each n-qubit state is associated with a unique one n-spin configuration of the n ordered spins; applying the unitary operator, by the quantum computer, to the another n-qubit state resulting in another evolved n-qubit state; measuring, by the quantum computer, the another evolved n-qubit state to identify a corresponding one of the n-spin configurations; and calculating, on the classical computer, an acceptance probability to determine whether to replace the another n-spin configuration with the n-spin configuration corresponding to the another evolved n-qubit state or whether to keep the another n-spin configuration unmodified by the applying the unitary operator to obtain the output n-spin configuration.

Another aspect of the present invention is to provide a system of providing samples from a distribution approximating the Boltzmann distribution of an n-bit Ising model. The system includes a classical computer configured to: receive coupling coefficients for spin-spin interactions between spins pairs of n ordered spins, field coefficients local to each spin and a temperature for the n-spin Ising model, the n-spin Ising model having an energy associated with each configuration of n ordered spins; and selecting, by the classical computer, a first n-spin configuration of the n ordered spins. The system also includes a quantum computer configured to: prepare a first n-qubit state on the quantum computer that is associated with the selected first n-spin configuration, wherein each n-qubit state is associated with a unique one n-spin configuration of the n ordered spins; apply a unitary operator to the selected first n-qubit state resulting in an evolved second n-qubit state; measure the evolved second n-qubit state to identify a corresponding one of the n-spin configurations. The classical computer being further configured to calculate an acceptance probability to determine whether to replace the selected first n-spin configuration with the second n-spin configuration corresponding to the evolved second n-qubit state or whether to keep the selected first n-spin configuration unmodified by the applying the unitary operator to obtain an output n-spin configuration. The selecting, the applying, the measuring and the calculating are repeated until the output n-spin configuration is sufficiently close to the Boltzmann distribution of the n-spin Ising model.

In an embodiment, the Boltzmann distribution of an n-bit Ising model is defined by a temperature T, a function $$E(x) = -\sum_{k>j=1}^{n} J_{jk} x_j x_k - \sum_{j=1}^{n} h_j x_j$$

that assigns an energy value to every n-bit state $x=(\pm -1, \ldots, \pm 1)$ where $J_{jk}$ and $h_j$ are coupling and field coefficients respectively, and where the Boltzmann distribution assigns a probability $$\mu_x = \mathcal{Z}^{-1} e^{-\frac{E(x)}{T}}$$

to each n-bit state x where $$\mathcal{Z} = \sum_x e^{-\frac{E(x)}{T}}$$

is a normalizing coefficient.

In an embodiment, the classical computer is configured to select a first n-qubit state encoding the input n-bit state x in the quantum computational basis. Ian embodiment, the quantum computer is configured to measure the evolved n-qubit state in the quantum computational basis, a second n-bit state y; and apply the unitary operator to the input n-cubit state resulting in an evolved n-qubit state includes implementing a quantum channel $C_E$ which defines a proposal probability $q_{yx}$ of proposing the second n-bit state in the quantum computational basis y starting with the first n-qubit state encoding the input n-bit state x in the quantum computational basis that is equal to a proposal probability $q_{xy}$ of proposing the first n-bit state in the quantum computational basis state x starting with the second n-cubit state encoding the n-bit state y in the quantum computational basis, such that the ratio of the proposal probability $q_{yx}$ to the proposal probability $q_{xy}$ is equal to one.

In an embodiment, the classical computer is further configured to calculate an acceptance probability $A_{yx}$ that depends on the ratio of the proposal probability $q_{yx}$ to the proposal probability $q_{xy}$.

In an embodiment, the quantum computer is further configured to implement Hamiltonian dynamics through an analog or a digital quantum simulation which defines the proposal probability $q_{yx}$ and the proposal probability $q_{xy}$.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

Figure 7A:
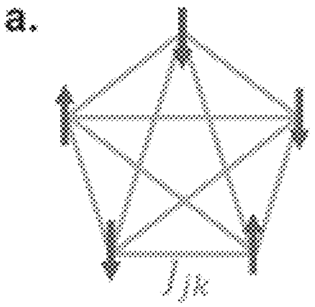
FIG. 7A is graph depicting an n=5 model instance where arrows (vertices) represent spins and edges represent the $$\binom{n}{2}$$
Figure 7B:
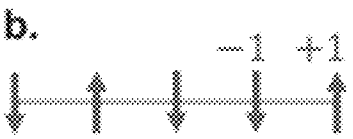
Figure 8:
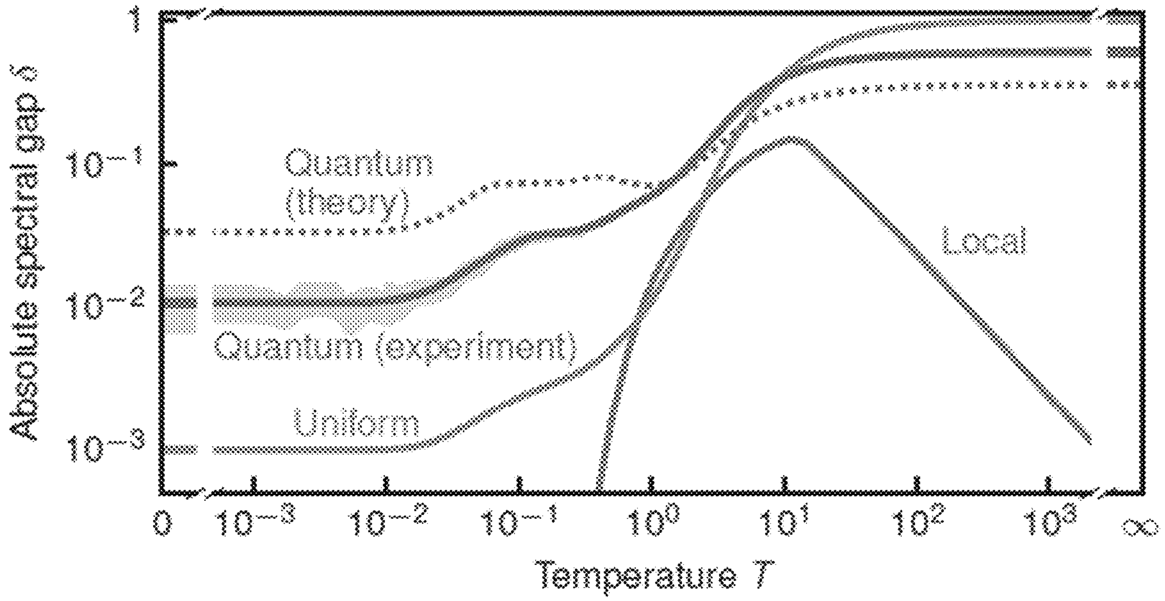
Figure 9A:
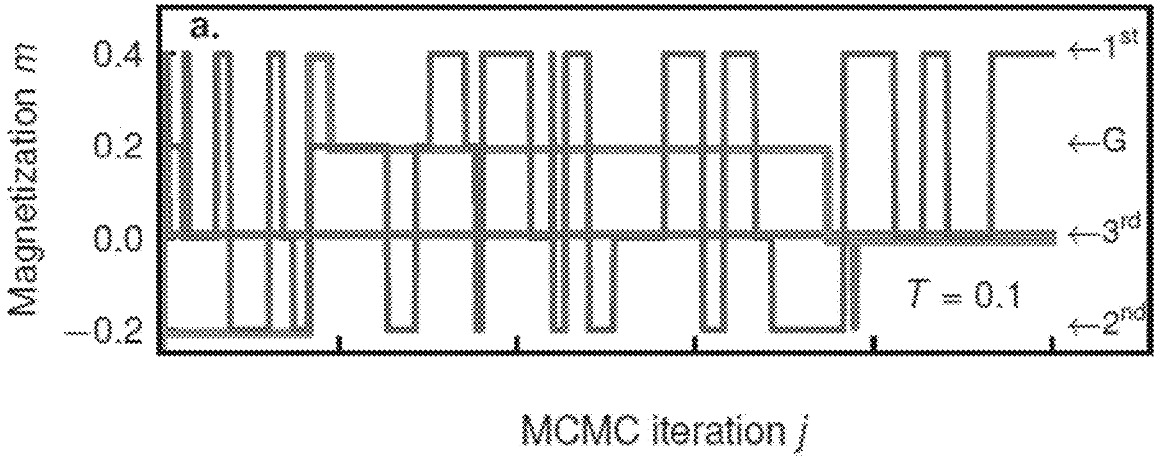
Figure 9B:
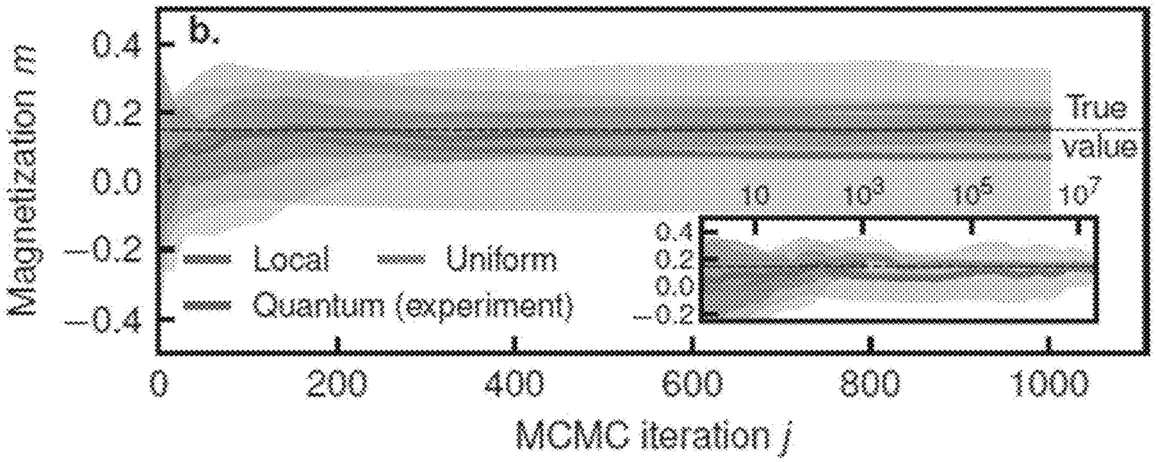
Figure 10A:
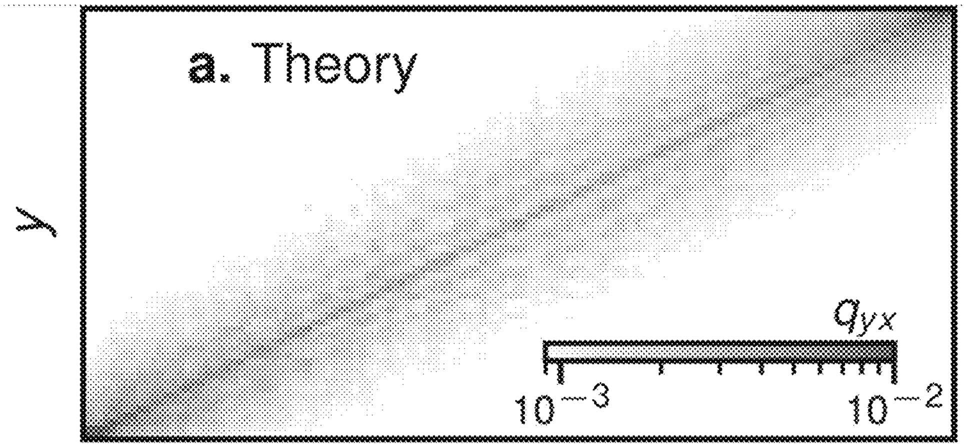
Figure 10B:
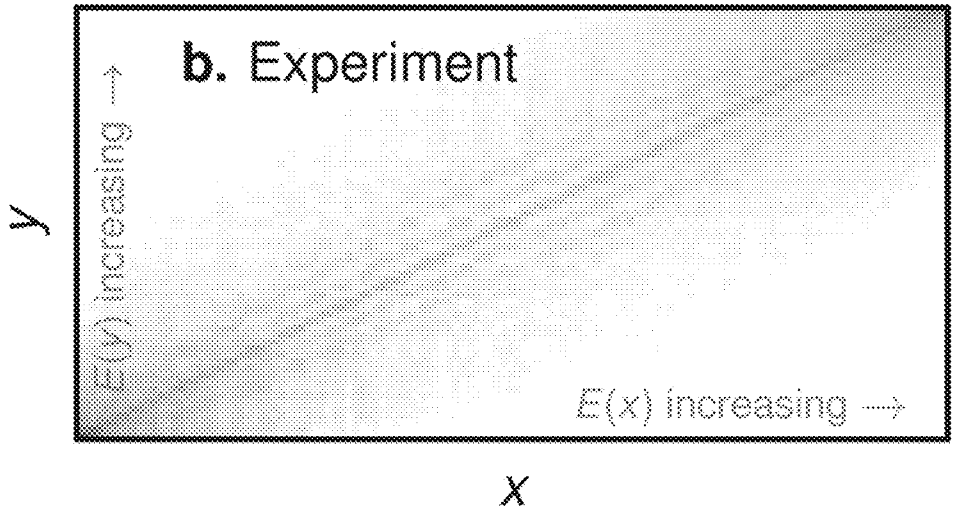
Figure 10C:
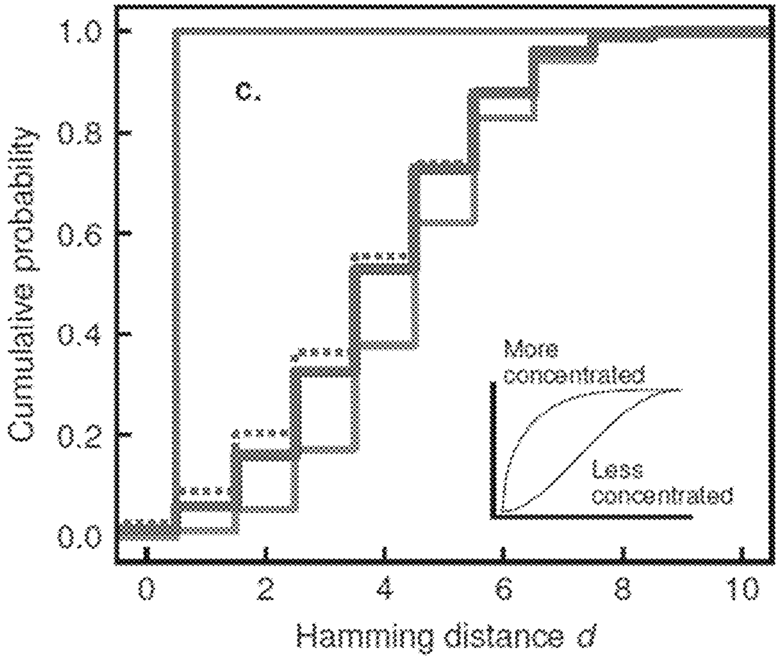
Figure 10D:
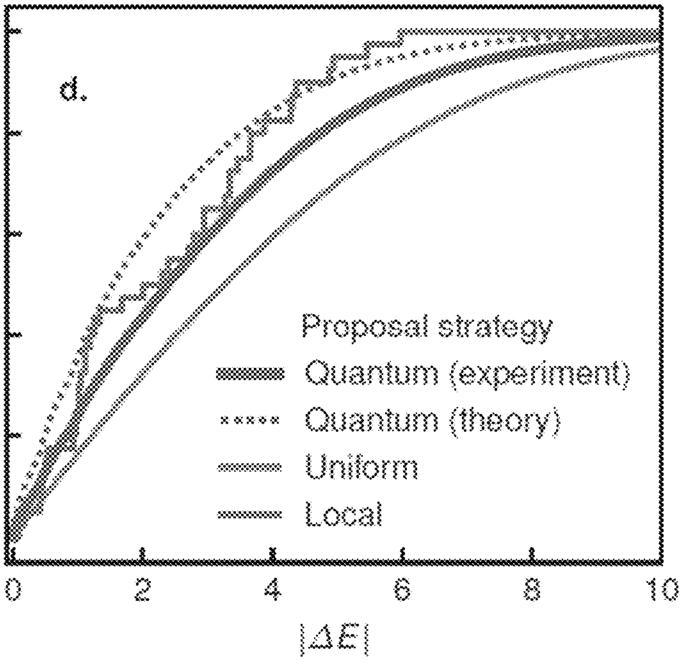

non-zero couplings $J_{jk}$, according to an embodiment of the present invention;

FIG. 7B shows an example of a n=5 spin model instance with only a n−1 non-zero couplings, according to an embodiment of the present invention;

FIG. 8 is a plot of the absolute spectral gap δ for an illustrative model instance on n=10 spins with 1D connectivity as illustrated in FIG. 7B, according to an embodiment of the present, invention;

FIG. 9A is a plot of the current magnetization $m(x^{(j)})$ for individual Markov chains after j iterations, for the same illustrative model instance as FIG. 8, according to an embodiment of the present invention;

FIG. 9B is a plot of the magnetization showing the convergence of the running average $$\overline{m}^{(j)} = \frac{1}{j}\sum_{k=0}^{j} m(x^{(k)})$$

from MCMC trajectories to the true value of $\langle m \rangle_\mu$ for different proposal strategies, for the same illustrative model instance as FIG. 8, according to an embodiment of the present invention;

FIG. 10A shows a classically-simulated probabilities of x→y proposals in our quantum algorithm, represented as a $2^n \times 2^n$ matrix whose columns are independent histograms, for the same illustrative model instance as FIG. 8, according to an embodiment of the present invention;

FIG. 10B shows estimated proposal probabilities for our algorithm's experimental realization, for the same illustrative model instance as FIG. 8, according to an embodiment of the present invention;

FIG. 10C shows the probability distributions of Hamming distance between current spin (x) and proposed spin (y) configurations, for a uniformly random current configuration, for the same illustrative model instance as FIG. 8, according to an embodiment of the present invention; and FIG. 10D shows analogous distributions for $|\Delta E| = |E(y) - E(x)|$ of proposed jumps, for the same illustrative model instance as FIG. 8, according to an embodiment of the present invention.

DETAILED DESCRIPTION

An Ising model defines a probability distribution on n-bit strings called a "Boltzmann distribution," which assigns the highest probabilities to the lowest-energy strings. (The specific probabilities depend on the energies and on the temperature T.) Our method produces samples from distributions which are arbitrarily close to such Boltzmann distributions. That is, the present method generates random n-bit strings, each with probability approximately equal to that given by the desired Boltzmann distribution, to within any desired error tolerance. This is called sampling from the Boltzmann distribution.

A probability distribution is a mathematical function that assigns probabilities to elements of a set. These probabilities must all be between 0 and 1, and they must sum to 1. Sampling from a probability distribution means drawing a random element from the set, such that the likelihood of drawing any element equals, or approximately equals up to a desired error tolerance, the probability assigned to that element by the distribution. Sampling can refer to drawing a single sample, as described above, or to drawing many such samples.

For instance, consider the set S={A, B, C} and the probability distribution Pr(A)=0.25, Pr(B)=0.4 and Pr(C)=0.35. Sampling from this distribution means: "Return a random element from S. It should be A, B or C with probability 25%, 40% and 35% respectively." It can also mean "Return several such elements of S, each with those probabilities."

The term spin is intended to refer to a classical two-level system, with states sometimes called "spin up" and "spin down." These states can be mapped to a classical bit. These states can also be mapped to a quantum bit (qubit) of a quantum computing system.

In the context of an Ising model, a "spin" is a binary variable that can be +1 or −1. These are sometimes called "spin up" and "spin down" states. In some fields, it is customary to define a spin as taking values 0 and 1, rather than +1 and −1. These two conventions are equivalent (in that it is trivial to convert between them). However, when using mathematical expressions it may be simpler to use +1 and −1 convention.

The "spins" we talk about in the problem statement, when defining an Ising model, are not quantum mechanical. One could equivalently call them "bits," but it is important to emphasize that they take values of +1 or −1 in our equations, not 0 or 1. (The difference is a matter of convention, not substance.) However, as part of our algorithm, we prepare qubits in quantum states that depend on the states of these (classical) spins/bits.

The term "configuration of n ordered spins" can be understood by envisioning n spins arranged along a line in which each of the n spins has either a spin up (1) or spin down (−1) value. For example when n=2, the possible configurations are (1,1), (−1,1), (1, −1) and (−1, −1). Qubit states associated with these configurations are |00>, |10>, |01>, and |11.>.

An Ising model, on bits, assigns a value of energy defined according to equation (1):

$$E(x) = -\sum\nolimits_{k>j=1}^{n} J_{jk}x_jx_k - \sum\nolimits_{j=1}^{n} h_jx_j \tag{1}$$

and a corresponding probability $$\mu_x = \frac{\exp[-E(x)/T]}{\mathcal{Z}}$$

to each n-bit string $x\in\{-1, 1\}^n$ for some parameter T>0, where $$\mathcal{Z} = \sum\nolimits_x e^{-\frac{E(x)}{T}}.$$

E, T and $\mathcal{Z}$ are sometimes respectively called the energy, temperature, and partition function. The resulting μ is sometimes called the Boltzmann distribution.

Figure 6:
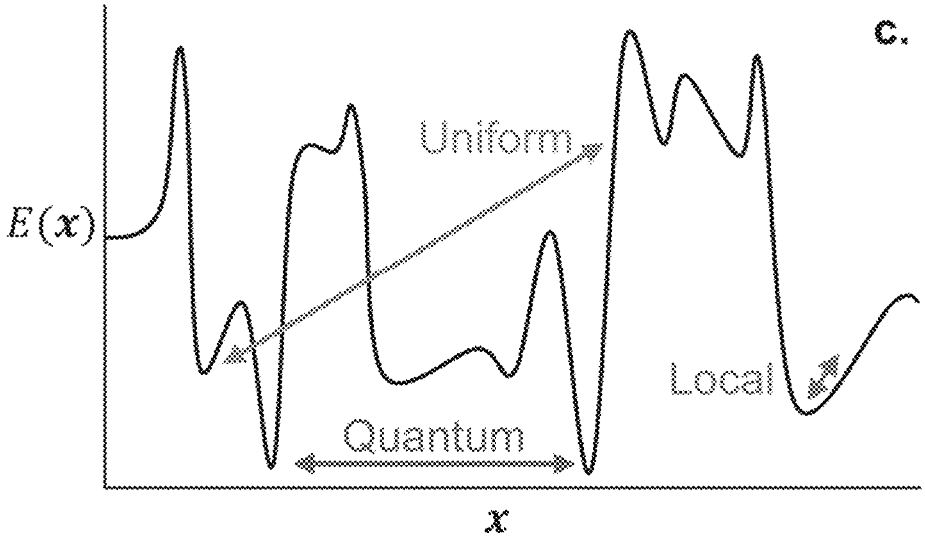
FIG. 6 shows a schematic representation of a rugged energy landscape typical of spin glasses, with configurations $x \in \{-1,1\}^n$, according to an embodiment of the present invention.

A user specifies parameters $\{J_{jk}\}$, $\{h_j\}$ and T>0, and asks for a sequence $(z^{(1)}, z^{(2)}, \ldots, z^{(r)})$ of n-bit strings $z^{(m)}$, called samples, such that the probability $Pr(z^{(m)}=x)\approx\mu_x$ for all $m\in[1, r]$ and $x\in\{-1,1\}^n$. Equation (1) typically defines a rugged energy landscape for Ising model instances where $J_{jk}$ and $h_j$ have varying signs and follow no simple pattern, informally called spin glasses, with many local minima that can be far from one another in Hamming distance, as depicted in FIG. 6. FIG. 6 shows a schematic representation of a rugged energy landscape typical of spin glasses according to an embodiment of the present invention. Typical proposed j-amps for three MCMC algorithms, to and from local minima, are also shown for illustration. In T→0 limit, sampling from u amounts to minimizing E(x), which is NP-hard for spin glasses. For small but non-zero T, sampling from μ requires finding several of the lowest-energy configurations, which may be far apart, not just the ground configuration(s). This hard regime may be challenging. However, the present described methods provide solutions that were not contemplated by conventional methods. The Hamming distance $\|x-y\|_{Hamming}$ between two strings x and y of equal length is the number of positions at which the corresponding symbols are different. The Hamming distance is one of several string metrics for measuring the edit distance between two sequences.

Sampling from μ is a common subroutine for computing thermal averages in statistical physics and machine learning, and for combinatorial optimization. However, this sampling is often a computational bottleneck when $J_{jk}$ and $h_j$ have varying signs and follow no simple pattern. The Ising model typically defines a rugged energy landscape for such instances, informally called spin glasses, with many local minima that can be far from one another in Hamming distance. In T→0 limit, sampling from μ amounts to minimizing E(x). For small but non-zero T, sampling from μ includes finding several of the lowest-energy configurations, which may be far apart, but not just the ground configuration(s).

The design characteristics for such a problem are: (1) The time required to produce the samples and (2) the approximation errors $\|\zeta^{(m)}-\mu\|_{TV}$, where $\zeta^{(m)}$ is the actual distribution of $z^{(m)}$, with elements given by $$\zeta_x^{(m)} = Pr(z^{(m)} = x), \text{ and } \|\zeta^{(m)} - \mu\|_{TV}$$

denotes the total variation distance between the distributions $\zeta^{(m)}$ and μ, defined as one half of the aggregate absolute difference between the probabilities assigned to every configuration by either distribution. In some applications, a desired goal may also include minimizing the correlations between elements of this sequence.

The sampling from μ problem arises in many fields including: (1) Many-body physics: Ising models were first proposed as mathematical models of magnetism. One can estimate numerous physical quantities at thermal equilibrium for these models (e.g., magnetization or correlations), for which direct computation may be prohibitively slow, by sampling from their μ. (2) Machine learning: Ising models are used in machine learning models called Boltzmann machines, where the parameters $\{J_{jk}\}$ and $\{h_j\}$ are tuned until the corresponding μ at T=1 matches the distribution implied by a given data set. Boltzmann machines' training and inference steps both rely on sampling from Ising model Boltzmann distributions at T=1. Famously, slow or inaccurate sampling can limit overall performance. (3) Optimization: Many combinatorial optimization problems can be cast as Ising models in which the ground state encodes the solution. Finding the ground state in turn amounts to sampling from the corresponding μ at T=0. While setting T=0 directly could cause many sampling algorithms (including ours) to fail, there are well-known workarounds. For instance, simulated annealing and parallel tempering algorithms sample from μ's at progressively decreasing, but positive, T's. Accelerating the sampling step in each could accelerate the overall optimization, e.g., by allowing a faster decrease in T (cooling schedule) in simulated annealing.

Current and emerging quantum computers are not sufficiently powerful to run most known quantum algorithms at useful scales, due to their small size and high noise levels. However, they can sample from probability distributions that are increasingly hard to sample from using classical computers. At present, however, these distributions are not manifestly useful for problems of practical significance. Therefore, it would worthwhile to bridge this gap by using random samples from quantum computers (which follow complicated, but not manifestly useful distributions when considered alone) to speed up MCMC, and in turn quickly sample from Ising model Boltzmann distributions (which can be useful).

Therefore, one goal of the present invention is to shorten the burn-in period of 2-step Markov Chain Monte Carlo (MCMC) by suggesting moves using a quantum computer, simulator or quantum annealer, and then computing appropriate acceptance probabilities on a classical computer. Intuitively, this hybrid quantum/classical approach could provide a quantum enhancement in the Markov chain mixing time $t_{mix}(\epsilon)$ by exploring the energy function E in quantum superposition during each jump, and by tunneling between distant local minima of E. It could also reduce correlations between samples. Before describing in further detail embodiments of the present invention, it may be useful to provide definition of some terms used herein throughout.

Markov chain Monte Carlo (MCMC) is a type of process/algorithm commonly used for sampling from the Boltzmann distribution of Ising models. It approaches the problem indirectly, without ever computing fax and in turn the partition function $\mathcal{Z}$, which would take $\Omega(2^n)$ time. Rather, MCMC performs a sequence of random jumps between spin configurations, starting from a generic one and jumping from x to y with fixed transition probability $p_{yx}$ in any iteration. It performs a series of random jumps over n-bit strings at discrete timesteps, jumping $x \rightarrow y$ with probability $p_{yx}$ at each one. The $p_{yx}$ are chosen so that the probability of the algorithm being in state x approaches $\mu_x$ after sufficiently many timesteps, regardless of the initial state.

To produce the desired samples $(z^{(1)}, \ldots, z^{(r)})$ with MCMC, we first pick an initial n-bit string, typically at random. We then perform $\gtrsim t_{mix}(\epsilon)$ jumps, where $t_{mix}(\epsilon)$ is the Markov chain's mixing time for a desired error tolerance $\epsilon$. (It refers to a number of steps, not an actual duration.) This is called the burn-in period. We record the next r states as $(z^{(1)}, \ldots, z^{(r)})$.

The duration of the burn-in period is at least $t_{mix}(\epsilon)\cdot\Delta t \equiv$ (number of steps)×(typical step duration). If a user wants many samples (compared to the mixing time), many MCMC instances could be run in parallel, and the overall running time would still be limited by the burn-in period. Reducing $t_{mix}(\epsilon)$ also generally reduces correlations between samples, which is sometimes desirable.

A common way to implement transition probabilities that ensure convergence to the desired Boltzmann distribution μ is to decompose each random jump into two steps, giving $p_{yx}=A_{yx}q_{yz}$ for $x\neq y$:

Step 1 (Proposal): Starting at state x, move to a candidate state y with some proposal probability $q_{yx}$.

Step 2 (accept/reject): Accept the move(i.e., stay at y) with probability $A_{yx}$, otherwise return to x.

In Step 2 one computes an appropriate acceptance probability $A_{yx}$ based on the matrix $Q=(q_{yx})_{yx}$ of proposal probabilities and μ, then moves to y with that probability (i.e., accepts the proposal), otherwise one remains at x. This gives $p_{yx}=A_{yx}q_{yx}$ for $x\neq y$.

If Q satisfies mild restrictions (e.g., all $q_{yx}>0$), any $A_{yx}$ satisfying $1\geq A_{yx}=\alpha_{yx}A_{xy}>0$ guarantees convergence to μ, where $$\alpha_{yx} = \frac{e^{\frac{[E(x)-E(y)]}{T}} q_{xy}}{q_{yx}}. \tag{9}$$

There are infinitely many such choices, giving slightly different MCMC algorithms with potentially different mixing times. Two of the most common are listed in the following Table 1.

TABLE 1

| Acceptance probability | Name of resulting MCMC algorithm |
|---|---|
| $A_{yx} = \min(1, \alpha_{yx})$ | Metropolis(-Hastings) algorithm |
| $A_{yx} = \left(1 + \frac{1}{\alpha_{yx}}\right)^{-1}$ | Glauber dynamics or Gibbs sampler |

In general, $\alpha_{yx}$ must be classically computable in a reasonable time for Δt to remain small. The choice of Q (subject to mild restrictions) does not affect whether such algorithms converge to the Boltzmann distribution, but it can strongly affect the duration of the burn-in period through both $t_{mix}(\epsilon)$ and Δt. Infinitely many Q's can be easily realized with a classical computer. Common choices include:

Flipping one bit of x chosen uniformly at random, which is sometimes called the local proposal strategy, and which gives:

$$q_{yx} = \begin{cases} 1/n & \text{if } \|x-y\|_{Hamming} = 1 \\ 0 & \text{otherwise} \end{cases} \tag{3}$$

Picking a candidate y uniformly at random, sometimes called the uniform proposal strategy, which gives $q_{yx}=2^{-n}$, and combinations thereof (which have $q_{yx}>0$ for all y and x, thus satisfying the "mild restrictions" on Q).

Two-step MCMC algorithms (for example, Metropolis and Glauber) with these Q's are widely used. While the MCMC algorithm are often successful, there is a wide class of problems where they suffer from impractically large mixing times $t_{mix}(\epsilon)$. These problems typically feature low temperatures T and complicated energy landscapes E with many local energy minima. Most MCMC algorithms are prone to getting stuck in these local energy minima for many timesteps or time cycles. For these conditions, this may result in impractically long burn-in periods and strong correlations between samples.

To alleviate this issue, we introduce an MCMC algorithm which uses a quantum computer to propose moves and a classical computer to accept/reject them. It alternates between two steps: Step 1 (quantum proposal)—If the current configuration is x, prepare the computational basis state $|x\rangle$ on the quantum processor, where $x_j=\pm1$ refers to an eigenvalue of $Z_j$. For example, if $x=(1, 1, -1)$, prepare $|x\rangle=|001\rangle$. We use $X_j$, $Y_j$ and $Z_j$ to denote $\sigma_x$, $\sigma_y$ and $\sigma_z$ on qubit j respectively. Then we apply a unitary U satisfying the symmetry constraint:

$$|\langle y|U|x\rangle| = |\langle x|U|y\rangle| \text{ for all } x,y\in\{-1,1\}^n \tag{4}$$

Finally, we measure each cubit in the Z eigenbasis, i.e., the computational basis, denoting the outcome y.

Step 2 (classical accept/reject): We compute $A_{yx}$ on a classical computer and jump to y with this probability, otherwise we stay at x. While computing $q_{yx}$ and $q_{xy}$ may take exponential (in n) time in general, there is no need to do so: Eq. (3) depends only on their ratio, which equals 1 since $q_{yx}=|\langle y|U|x\rangle|^2=q_{xy}$. This cancellation underpins our algorithm, and mirrors that between $\mu_x$ and $\mu_y$, wherein the partition function $\mathcal{Z}$ drops out of $\alpha_{yx}$ and in turn $A_{yx}$, and therefore need not be computed. The resulting Markov chain provably converges to the Boltzmann distribution μ, but is hard to mimic classically, provided it is classically hard to sample the measurement outcomes of $U|x\rangle$. This combination opens the possibility of a useful quantum advantage.

Figure 1:
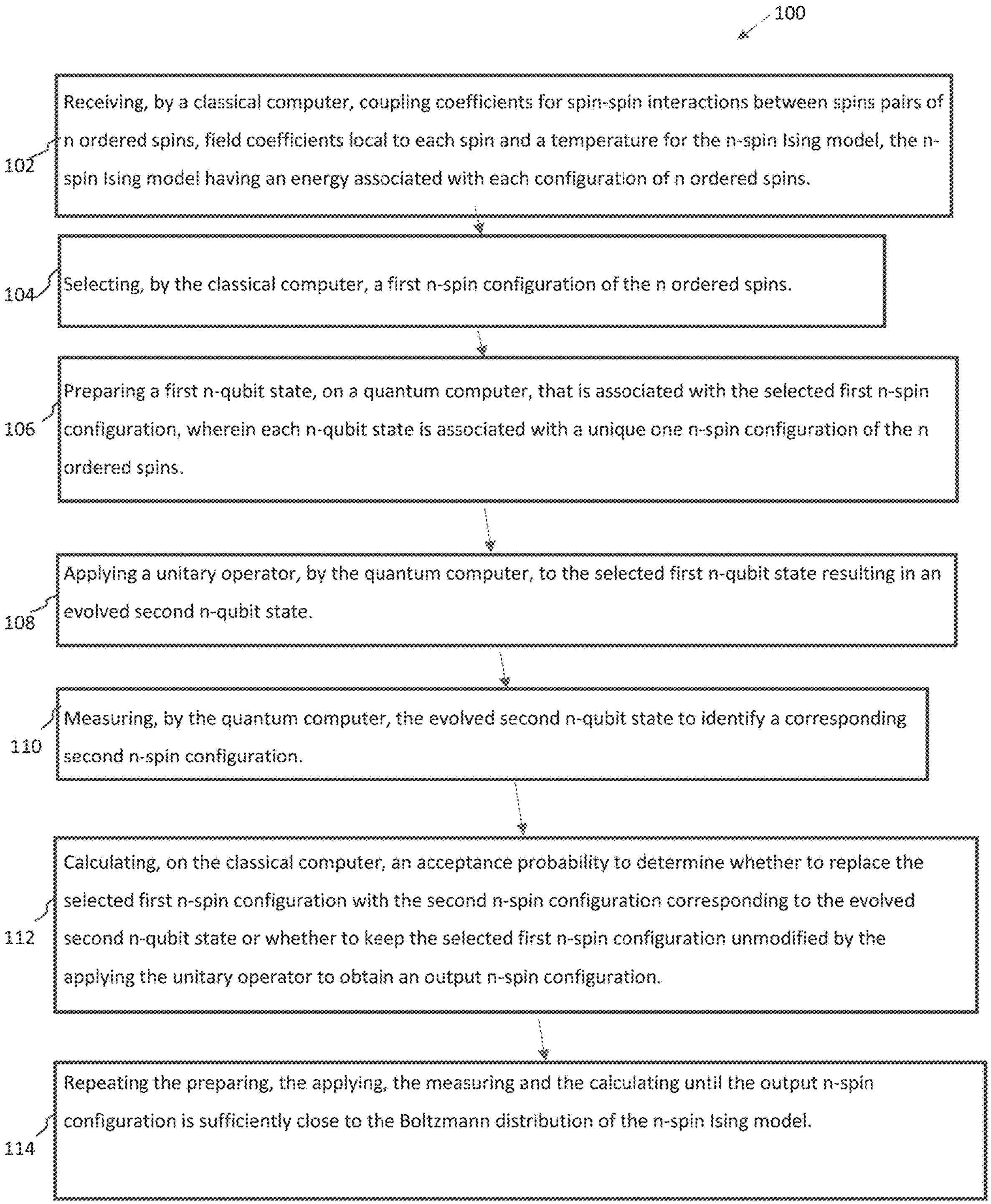
FIG. 1 is a flow diagram of a method of providing samples from a distribution approximating a Boltzmann distribution of an n-bit Ising model, according to an embodiment of the present invention.
Figure 2:
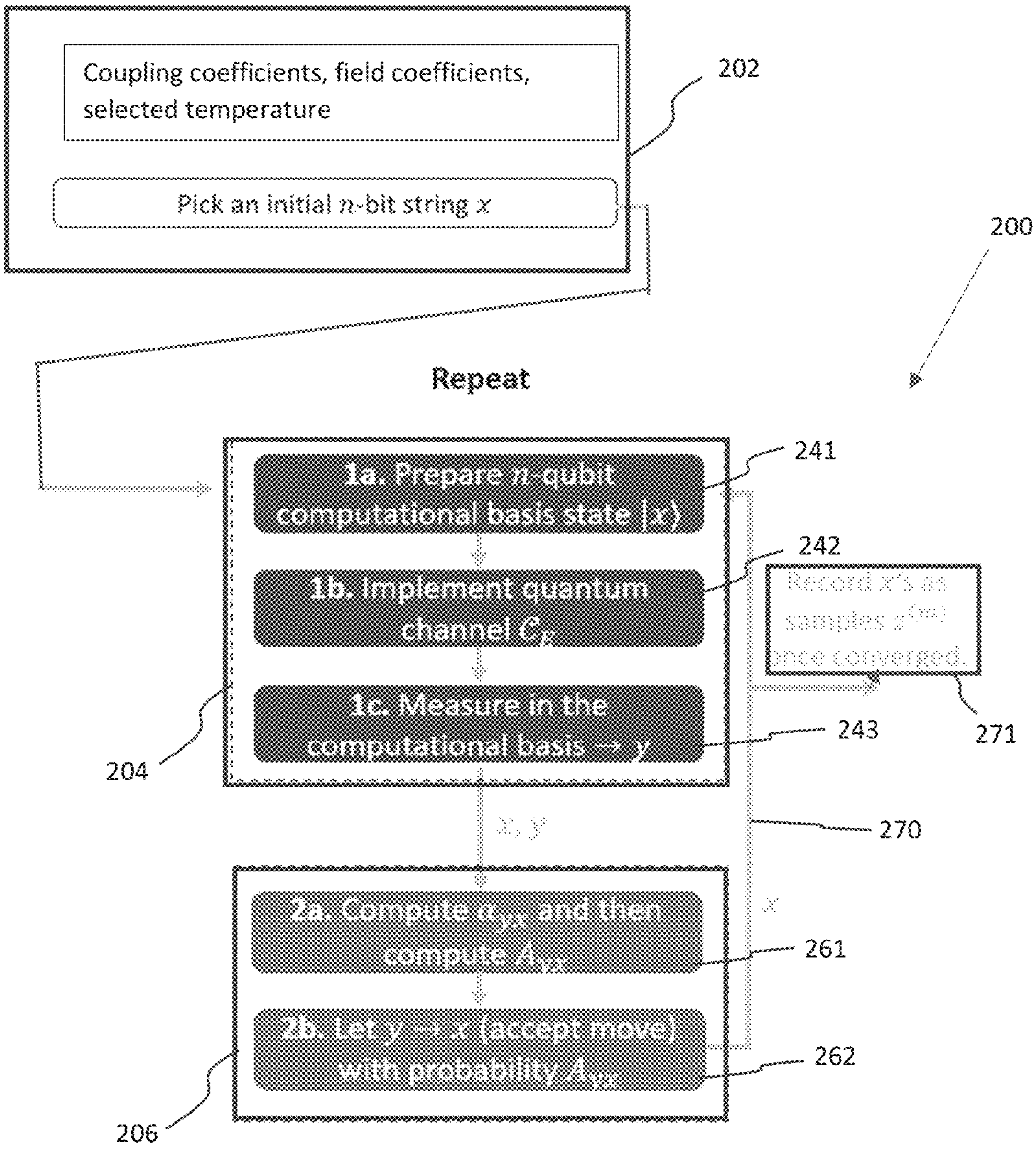
FIG. 2 is a schematic diagram of a computer system of providing samples from a distribution approximating the Boltzmann distribution of an n-bit Ising model, the system includes one or more classical computers, and a quantum computer, according to an embodiment of the present, invention.

FIG. 1 is a flow diagram of a method 100 of providing samples from a distribution approximating a Boltzmann distribution of an n-bit. Ising model, according to an embodiment of the present invention. FIG. 2 is a schematic diagram of computer system 200 of providing samples from a distribution approximating the Boltzmann distribution of an n-bit Ising model, the system includes a first classical computer 202, a quantum computer 204 and a second classical computer 206 according to an embodiment of the present invention. The first classical computer 202 and the second classical computer 206 can be the same or different classical computers.

Referring to both FIGS. 1 and 2, the method 100 includes receiving, by a classical computer 202, coupling coefficients for spin-spin interactions between spins pairs of n ordered spins, field coefficients local to each spirt and a temperature for the n-spin Ising model, the n-spin Ising model having an energy associated with each configuration of n ordered spins, at step 102. The method 100 further includes selecting, by the classical computer 202, a first n-spin configuration of the n ordered spins, at step 104. The method 100 also includes preparing a first n-qubit state, on quantum computer 204, that is associated with the selected first n-spin configuration, wherein each n-qubit state is associated with a unique one n-spin configuration of the n ordered spins, at step 106. The method 100 includes applying a unitary operator, by the quantum computer, to the selected first n-qubit state resulting in an evolved second n-qubit state, at step 108. The method 100 also includes measuring, by the quantum computer 204, the evolved second n-qubit state to identify a corresponding second n-spin configuration, at step 110. The method 100 further includes calculating, on the classical computer 204 and/or the classical computer 206, an acceptance probability to determine whether to replace the selected first n-spin configuration with the second n-spin configuration corresponding to the evolved second n-qubit state or whether to keep the selected first n-spin configuration unmodified by the applying the unitary operator to obtain an output n-spin configuration, at step 112. The method includes repeating the preparing, the applying, the measuring and the calculating until the output n-spin configuration is sufficiently close to the Boltzmann distribution of the n-spin Ising model, at step 114.

In an embodiment, the Boltzmann distribution of an n-bit Ising model is defined by a temperature T, a function E(x) given by the following equation:

$$E(x) = -\sum\nolimits_{k>j=1}^{n} J_{jk} x_j x_k - \sum\nolimits_{j=1}^{n} h_j x_j \tag{5}$$

that assigns an energy value to every n-bit state $x=(\pm1, \ldots, \pm1)$ where $J_{jk}$ and $h_j$ are coupling and field coefficients respectively, and where the Boltzmann distribution assigns a probability $\mu_x$ to each n-bit state x $$\mu_x = \mathcal{Z}^{-1} e^{-\frac{E(x)}{T}}, \tag{6}$$

where $\mathcal{Z}$ is a normalizing coefficient sometimes called the partition function $$\mathcal{Z} = \sum\nolimits_x e^{-\frac{E(x)}{T}}. \tag{7}$$

In an embodiment, the Boltzmann distribution is defined at the classical computer 202.

In an embodiment, in the method 100, preparing the input n-qubit state on the quantum computer 204 encoding the input n-bit state, at step 106 includes selecting a first n-qubit state encoding the input n-bit state x in the quantum computational basis, at 241, on the quantum computer 204. In an embodiment, in the method 100, measuring, by the quantum computer 204, the evolved n-qubit state, at step 110, includes measuring, by the quantum computer 204 in the quantum computational basis, a second n-bit state y, at 242. In an embodiment, in the method 100, applying the unitary operator, by the quantum computer 204, to the input n-qubit state resulting in an evolved n-qubit state, at step 108, includes implementing a quantum channel $C_E$, using the quantum computer 204, which defines a proposal probability $q_{yx}$ of proposing the second n-bit state in the quantum computational basis y stalling with the first n-qubit state encoding the input n-bit state x in the quantum computational basis that is equal to a proposal probability $q_{xy}$ of proposing the first n-bit state in the quantum computational basis state x starting with the second n-qubit state encoding the n-bit state y in the quantum computational basis, such that the ratio of the proposal probability $q_{yx}$ to the proposal probability $q_{xy}$ is equal to one, at 243.

In an embodiment, in the method 100, calculating, on the classical computer 206, the acceptance probability to determine whether to replace the input n-bit state with the output n-bit state or whether to keep the input n-bit state unmodified by the applying, at step 112, includes calculating, using the classical computer 206, an acceptance probability $A_{yx}$ that depends on the ratio of the proposal probability $q_{yx}$ to the proposal probability $q_{xy}$, at 261.

In an embodiment, calculating the acceptance probability $A_{yx}$, at 261 using the classical computer 206 includes calculating, using the classical computer 206, coefficients $\alpha_{yx}$, where $$\alpha_{yx} = \frac{e^{\frac{[E(x)-E(y)]}{T}} q_{xy}}{q_{yx}} = e^{\frac{[E(x)-E(y)]}{T}}, \tag{8}$$

where the acceptance probability satisfies $1 \geq A_{yx} = \alpha_{yx} A_{yx} > 0$ to guarantee detailed balance, for instance $A_{yx}=\min(1, \alpha_{yx})$ which gives a Metropolis-Hastings algorithm, or $$A_{yx} = \left(1 + \frac{1}{\alpha_{yx}}\right)^{-1} \tag{9}$$

which gives a Glauber dynamics/Gibbs sampler algorithm, where E(x) corresponds to an energy value in the Ising model of the first n-bit state x and E(y) corresponds to a value in the Ising model of the second n-bit state y, and T corresponds to the selected temperature.

Calculating $\alpha_{yx}$, and in turn $A_{yx}$ depend on $q_{yx}$ and $q_{xy}$, which can take time exponential in n to compute in general There would be little hope for a quantum speedup if the step 261 took exponentially longer than in conventional (purely classical) MCMC.

Therefore, this problem is solved, for example by using a channel $\mathcal{C}_E$, for which $q_{xy}=q_{yx}$. While $q_{yx}$ and $q_{xy}$ can still take exponential time to compute for such $\mathcal{C}_E$'s, there is no need to compute these $q_{yx}$ and $q_{xy}$ since $\alpha_{yx}$ depends only on the ratio between $q_{yx}$ and $q_{xy}$, and thus reduces to equation (10).

$$\alpha_{yx} = e^{\frac{[E(x)-E(y)]}{T}} \quad (10)$$

Equation (10) can be efficiently computable.

The resulting MCMC algorithm converges to the desired μ, but can be hard to mimic through purely classical means for sufficiently large n, since the matrix elements $q_{yx}$ of the quantum channel $\mathcal{C}_E$ can be difficult, to compute purely classically. Moreover, while noise in the quantum device may increase the mixing time, the algorithm will still converge to the Boltzmann distribution μ provided the noise can be made symmetric (i.e., $q_{xy}=q_{yx}$). Therefore, the present method solves the problem in conventional MCMC methods and has the benefit of being robust against noise in the quantum computer 204.

In an embodiment, in the method 100, after calculating the coefficients $\alpha_{yx}$, using the classical computer 206, with probability $A_{yx}$ accept the move and take y as the output state, otherwise reject the move and keep x as the output state, at 262.

In an embodiment, after accepting or rejecting the move from x to y, the process is repeated, at 270, by repeating the selecting, the preparing, the applying, the measuring and the calculating until a distribution of the output n-bit state is sufficiently close (converged) to the Boltzmann distribution of the n-bit Ising model, at 271.

In an embodiment, the repeating the selecting, the preparing, the applying, the measuring and the calculating includes selecting another input n-bit state, by the classical computer 202, based on another n-bit Ising model; preparing another input, n-qubit state on the quantum computer 204 encoding this other input n-bit state, at 241; applying a unitary operator (quantum channel $C_E$), by the quantum computer 204, to this other input n-qubit state resulting in another evolved n-qubit state; measuring, by the quantum computer 204, this other evolved n-qubit state, yielding another output n-bit state, at 243; and calculating, on the classical computer 206, another acceptance probability, at 261, to determine whether to replace this other input n-bit state with the output n-bit state or whether to keep the input n-bit state unmodified by the applying, at 262.

In an embodiment, implementing the quantum channel $C_E$ for which $q_{xy}$ equals $q_{yx}$ for all n-bit states x and y, using the quantum computer 204, includes implementing Hamiltonian dynamics through an analog or a digital quantum simulation, using the quantum computer 204, which defines the proposal probability $q_{yx}$ and the proposal probability $q_{xy}$.

In an embodiment, implementing Hamiltonian dynamics, using the quantum computer 204, includes evolving a quantum state by a Hamiltonian in the form:

$$H(\theta)=(1-\theta)\alpha H_E+\theta H_{mix}, \quad (1)$$

for θ selected within the interval from zero to one and an arbitrary scaling parameter α, where:

$$H_E = \sum_x E(x)|x\rangle\langle x| = -\sum_{k>j=1}^{n} J_{jk}Z_jZ_k - \sum_{j=1}^{n} h_jZ_j, \quad (12)$$

which depends on specified parameters $\{J_{jk}\}$, $\{h_j\}$, where $\{J_{jk}\}$, $\{h_j\}$ are, respectively, the coupling coefficients and field coefficients, wherein $Z_j$ and $Z_k$ are respectively Pauli $\sigma_z$ (sigma-z) matrices on qubits j and k, and $H_{mix}=\Sigma_P c_P P$, where $c_P$ are arbitrary real numbers and each P is a matrix from the set formed by arbitrary products of one or more of $X_j$ or $Y_jY_k$, where $X_j$ is a Pauli $\sigma_x$ (sigma-x) matrix on qubit j, and where $Y_j$ and $Y_k$ are Pauli $\sigma_y$ (sigma-y) matrices on qubits j and k respectively, so that $\langle y|H_{mix}|x\rangle \in \mathbb{R}$ for all n-bit states x and y.

In an embodiment, implementing Hamiltonian dynamics, on the quantum computer 204, includes applying an evolution of the Hamiltonian H(θ) with time t for fixed values of θ.

In an embodiment, computing, using the classical computer 206, an acceptance probability $A_{yx}$ includes computing the acceptance probability $A_{yx}$ using a same value θ and time t.

Quantum evolution by the Hamiltonian H(θ) for a time t with a fixed θ amounts to exploring the function E in quantum superposition, since $H_E$ encodes all values of E(x) and can be realized directly on an analog quantum simulator or a quantum annealer (with the transverse field held fixed). The quantum evolution can also be simulated on a quantum computer 204 using one of several digital quantum simulation methods.

Hamiltonians H(θ) based on complicated energy functions E, with $$H_{mix} = \sum_{j=1}^{n} X_j$$

can be investigated. However, for example in some cases, for a broad range of θ's, the Hamiltonian H(θ) has eigenvectors $|\psi\rangle=\Sigma_x\psi|x\rangle$ with large coefficients ψ(x) only on x's which are local energy minima E with similar energies. In this situation, evolution by the Hamiltonian H(θ) may induce tunneling between these potentially-distant local minima, as the minima have substantially the same energy.

In an embodiment, calculating, using the classical computer 206, an acceptance probability $A_{yx}$ includes calculating the acceptance probability $A_{yx}$ using different values θ and t selected at random for each jump from pre-determined distribution.

For example, in a first approach, the same θ and t can be selected in step 262. Alternatively, in a second approach, different θ and t can be selected at random for each jump from some pre-determined distribution. The first approach realizes a unitary $\mathcal{C}_E$ in principle, while the second approach realizes a non-unitary quantum channel $\mathcal{C}_E$ but the quantum channel $\mathcal{C}_E$ is symmetric in the sense that it provides symmetric acceptance probabilities $q_{yx}=q_{xy}$. In an embodiment, the second approach may not need fine-tuning of θ and t.

In an embodiment, implementing Hamiltonian dynamics, on the quantum computer, includes performing a quantum measurement in the eigenbasis of the Hamiltonian H(θ) for fixed values of θ.

In an embodiment, performing the quantum measurement in the eigenbasis of the Hamiltonian H(θ) for fixed values of θ includes performing a quantum phase estimation algorithm on the quantum computer 204 with n qubits and using controlled exp[−iH(θ)τ]-like gates through analog or digital quantum simulation, wherein r represents time.

In an embodiment, assuming That the Hamiltonian H(θ) has an eigenvector $|\psi\rangle = \Sigma_x \psi(x)|x\rangle$, and x and y are distant local minima of energy E with large coefficients ψ(x) and ψ(y) in $|\psi\rangle$. Then the quantum channel $\mathcal{C}_E$ resulting from an H(θ) eigenbasis measurement, followed by a computational basis measurement, will provide a large $q_{yx} \geq |\psi(x)\psi(y)|^2$.

Figure 3:
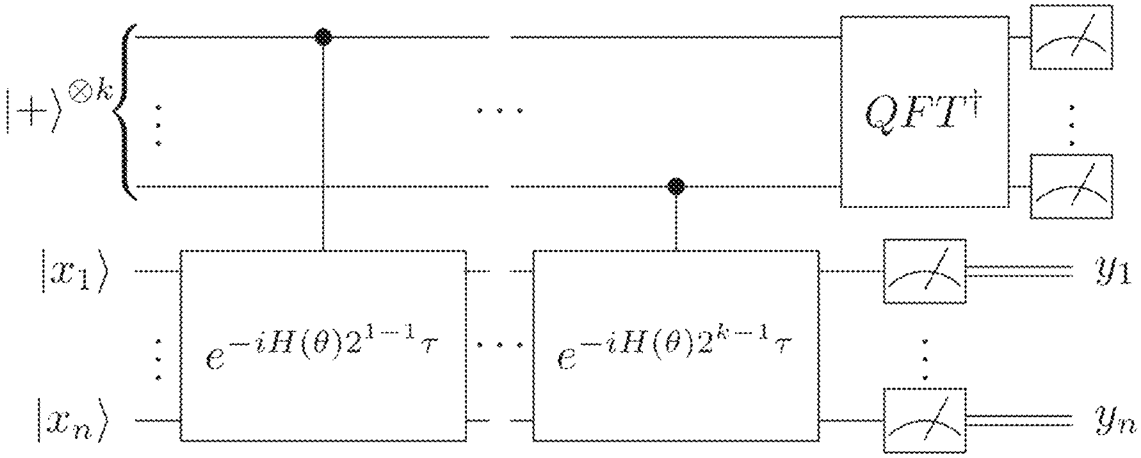
FIG. 3 depicts an example quantum circuit implemented on the quantum computer for implementing the quantum channel $\mathcal{C}_E$ depending on a Hamiltonian H(θ), according to an embodiment of the present invention.

In an embodiment, the measurement the Hamiltonian H(θ) eigenbasis can be approximated with the quantum phase estimation (QPE) algorithm on the quantum computer 204 with n qubits using, for example, the quantum circuit shown in FIG. 3. FIG. 3 depicts an example quantum circuit implemented on the quantum computer 204 for implementing the quantum channel $\mathcal{C}_E$ in the form of Hamiltonian H(θ), according to an embodiment of the present invention. The exp [−iH(θ)τ]-like gates can also be realized through digital quantum simulation. In principle, however, the resulting $\mathcal{C}_E$ is identical to that of the method described in the above paragraphs for the quantum evolution by the Hamiltonian H(θ), for a time t with a fixed a where t is drawn uniformly at random from $\{2^{\ell-1}\tau\}_{\ell=1}^{k}$ in each iteration. Therefore, while the present method in which the quantum measurement that is performed in the eigenbasis of the Hamiltonian H(θ) for fixed values of θ may have a different interpretation than the method of implementing the evolution of the Hamiltonian, both methods achieve the desired outcome of suggesting moves from x to y with high probability $q_{yx}$ when the energy E(x) of the state x is approximately equal to the energy E(y) of state y even when the Hamming distance $\|x-y\|_{Hamming}$ is relatively large compared to a Hamming distance of 1, as in Equation (3). Such moves from x try y can reduce the tendency of MCMC for being stuck around one energy minimum for many (e.g., tens, hundreds or more) sequential timesteps.

In an embodiment, implementing Hamiltonian dynamics, on the quantum computer 204, includes applying a nearly-adiabatic evolution by the Hamiltonian H(θ) with time varying θ.

In an embodiment, applying a nearly-adiabatic evolution by the Hamiltonian H(θ) with time varying θ includes applying a nearly-adiabatic evolution by the Hamiltonian H(θ) using a reverse quantum annealing procedure, wherein θ initially equals 0 and is slowly increased to some value of at most 1, then slowly decreased back to 0 in a symmetric manner.

For example, we assume that θ is a continuous function of time that ramps from 0 to 1 over the time interval $$\left[0, \frac{t}{2}\right],$$

then back to 0 over $$\left[\frac{t}{2}, t\right]$$

symmetrically about me midpoint (i.e., θ(τ)=θ(t−τ)). A computational basis measurement is performed at time t. This procedure is sometimes called "reverse quantum annealing." We also assume that $H_{mix}$ has no degeneracy, e.g., that $$H_{mix} = \sum_{j=1}^{n} c_j X_j$$

for random coefficients $c_j$, so that quantum transitions occur primarily at avoided crossings in the energy spectrum of H(θ), as a result of Landau-Zener transitions, rather than as a result of degeneracy.

If t is sufficiently large so as to realize adiabatic quantum dynamics, an initial state $|x\rangle$ can be adiabatically transformed to a corresponding eigenstate of $H_{mix}$ at time $$\frac{t}{2},$$

then back to $|x\rangle$ at time t. An adiabatic transition occurs in relatively slow regimes where the system/state has time to adapt a change from one conformation to another conformation at one or more crossings. On the other hand, a diabatic transition occurs in a faster regime where the state may undergo a small number of Landau-Zener transitions at avoided crossings and jump up/down to nearby energy levels. The output y will therefore have E(y)≈E(x) but may be far from x in Hamming distance. As in the two methods described in the above paragraphs, one can fix a single time t or select a random time C for each jump. This approach is adapted to be implemented on a quantum computer called a quantum annealer or an analog quantum simulator. However, this approach can also be simulated on a quantum computer using one of several digital quantum simulation techniques.

In theory, it may be desirable in Step 1 to call the quantum device only with probability 1−∈, and to propose a y uniformly at random with probability ε, for some small ε>0. This ensures that all $q_{yx}>0$, therefore satisfying the "mild restrictions" on Q and guaranteeing convergence to R. In practice this is unlikely to be necessary, since a noisy quantum device will likely give $q_{yx}>0$ even when ε=0. More broadly though, it may be desirable to propose a y with the quantum device only with some probability <1, and to use a classical method the rest of the time. Such a "mixed" approach could give the best of both worlds, and still lead to an efficiently-computable $A_{yx}$.

There is some evidence that the method implementing the evolution by the Hamiltonian H (θ) for fixed θ and the method of implementing a measurement in the eigenbasis of Hamiltonian H(θ) for fixed θ may provide large $q_{yx}$ when x and y are local energy minima of E with E(x)≈E(y). However, the proposal probabilities between states that are not local minima are less well understood. Therefore, in another embodiment, when using either of these methods, choosing a local minimum as the initial MCMC state may shorten the burn-in period. Such a minimum can typically be found efficiently by performing a classical hill-descent algorithm on E from a random starting point.

In an embodiment, we considered problems where E(x) is two-local (i.e., has terms $x_j$ and $x_j x_k$ but not $x_j x_k x_\ell$ and higher) so that $H_E$ would also be two-local (have only $Z_j$ and $Z_j Z_k$ terms). However, it is possible to simulate $H_E$'s with higher weight terms, and thus handle a broader class of energies E, at the cost of added experimental complexity. Similarly, $H_{mix}$ can also contain higher-weight terms if desired, provided $\langle y|H_{mix}|x\rangle \in \mathbb{R}$.

In the following paragraphs, we provide numerical results obtained using the method implementing the evolution by the Hamiltonian H(θ) for random θ and t applied to a family of Ising models. In the Ising models, problem instances are generated by picking all $J_{jk}$'s and $h_j$'s independently at random from a normal distribution with mean 0 and variance 1. This model is expected to lead to slow-mixing MCMC at low temperatures $T \lesssim 1$. We used $$H_{mix} = \sum_{j=1}^{n} X_j$$

and picked random t's and θ's for each jump according to t~unif (2, 20) and θ~unif (0.25, 0.6).

For each problem instance, we computed the absolute spectral gap δ of the resulting Markov chain, which is a common proxy for mixing time since $t_{mix}(\epsilon)=\Theta(\delta^{-1})$, as sometimes it can be difficult to compute the mixing time directly. Similarly, δ is a proxy for the strength of correlations between samples. For both figures of merit, a large δ indicates good performance.

We compared δ's for our quantum-classical MCMC algorithm with the conventional MCMC methods, which are labelled "local" and "uniform" on the following plots. We used Metropolis-Hastings acceptance probabilities throughout.

Figure 4:
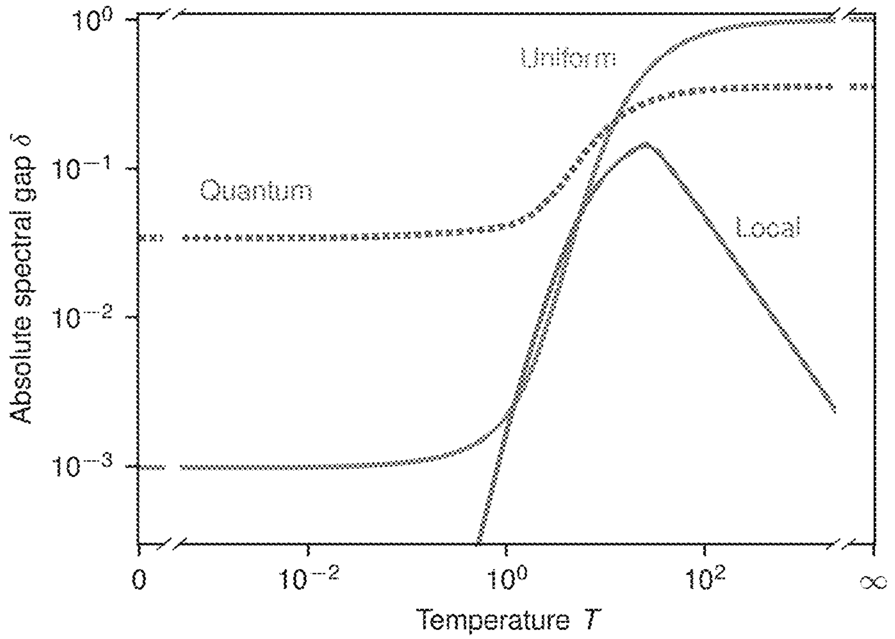
FIG. 4 is a plot of the absolute spectral gap δ, a measure of Markov Chain Monte Carlo (MCMC) convergence rate, versus temperature T, for fixed n, averaged over random Ising model instances, according to an embodiment of the present invention.
Figure 5:
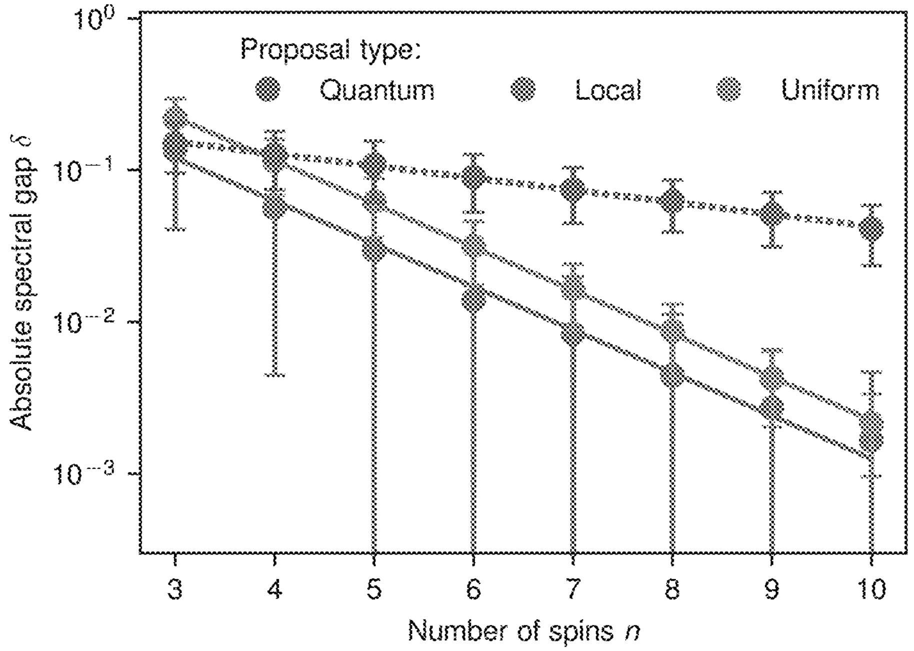
FIG. 5 is a plot of the absolute spectral gap δ versus n, for a fixed temperature of T=1, averaged over random Ising model instances, according to an embodiment of the present invention.

FIG. 4 is a plot of the absolute spectral gap δ versus temperature T, for fixed n, according to an embodiment of the present invention. FIG. 5 is a plot of the absolute spectral gap δ versus n, for a fixed T in the hard low-temperature regime, according to an embodiment of the present invention. Both of these plots show a quantum enhancement in MCMC. Error bands/bars denote standard deviation over problem instances, and lines show the means. For the first part of the analysis, we generated 500 random spin glass instances on n spins by drawing each $J_{jk}$ and $h_j$ independently from standard normal distributions. We did not explicitly fix any couplings $J_{jk}$ to zero; the random instances are therefore fully connected as illustrated in FIG. 7A. FIG. 7A is a graph depicting an n=5 model instance where arrows (vertices) represent spins and edges represent the $$\binom{n}{2}$$

non-zero couplings $J_{jk}$. Fields $h_j$ are not shown, according to an embodiment of the present invention. This ensemble is the archetypal Sherrington-Kirkpatrick model (up to a scale factor) with random local fields, where the fields serve to break inversion symmetry and thus increase the complexity. For each instance, we explicitly computed all the transition probabilities $\{p_{yx}\}$ and then δ as a function of T for different proposal strategies Q. We then averaged δ over the model instances, and repeated this process for $3 \le n \le 10$. The results describe the average MCMC convergence rate as a function of n and T. Two illustrative slices are shown in FIGS. 4 and 5, where n and T are held fixed in turn. At high T, where μ is nearly uniform, the uniform proposal produces a fast-converging Markov chain with δ near 1, as shown in FIG. 4. However, both the uniform and local proposals suffer a sharp decrease in δ at lower T. This slow-down is much less pronounced for our quantum algorithm, which gives a substantially better δ on average than either classical alternative for $T \lesssim 1$. All strategies were simulated classically. Lines/markers show the averaged over 500 random fully connected Ising model instances for each n; error bands/bars show the standard deviation in δ over these instances. Dotted lines are for visibility. FIG. 4 shows the slow-down of each strategy at low T. For the local proposal strategy, δ→0 also at high T because an eigenvalue of its transition matrix approaches −1. This artifact can be easily be remedied by using a lazy chain or the Gibbs sampler acceptance probability; the same is not true at low T, however. FIG. 5 show the problem size dependence, with least squares exponential fits to the average δ, weighted by the standard error of the mean. Table 2 shows the resulting fit parameters and the average quantum enhancement exponent, which is the ratio of k for the quantum algorithm and the smallest k among classical proposal strategy (the local strategy, here).

TABLE 2

| $\langle\delta\rangle \propto 2^{-kn}$ | |
|---|---|
| Quantum | k = 0.264 |
| Local | k = 0.94 |
| Uniform | k = 0.948 |

Quantum enhancement factor in k: 3.6

In the following paragraphs further experimental implementation is provided. For the second part of the analysis we focus in on individual model instances, for which we implemented our quantum algorithm experimentally and analyzed it in more depth than is feasible for a large number of instances. We generated random model instances and picked illustrative ones whose lowest-E configurations include several near-degenerate local minima—a central feature of spin glasses at larger n which hampers MCMC at low T. We then implemented our quantum algorithm experimentally for these instances on a multi-qubit quantum processor, using Qiskit, an open-source quantum software development platform. (The Ising model T has no relation to the processor's physical temperature.) We approximated $U=e^{-iHt}$ on this device through a randomly-compiled second-order Trotter-Suzuki product formula with up to 48 layers of pulse-efficient 2-qubit gates acting on up to 5 pairs of qubits in parallel. Unlike in the first part of the analysis, we restricted our focus to model instances where $J_{jk}=0$ for $|j-k|\neq 1$ as in FIG. 7B, in order to match the connectivity of qubits in the quantum processor for this initial demonstration. FIG. 7B shows an example of a n=5 spin model instance with only a n−1 non-zero couplings, according to an embodiment of the present invention. Simulations show that the average-case (5 for such instances is qualitatively similar to FIGS. 4 and 5.

FIG. 8 is a plot of the absolute spectral gap δ, a measure of MCMC convergence rate, for an illustrative model instance on n=10 spins with 1D connectivity as illustrated in FIG. 7B, according to an embodiment of the present invention. Each proposal strategy is combined with the Metropolis-Hastings acceptance probability. To infer δ for the experimental realization of our algorithm, we recorded $5.76\times10^7$ quantum transitions $|x\rangle \rightarrow |y\rangle$ between computational states with $|x\rangle$ uniformly distributed, to estimate each $q_{yx}$. For each T, we used the full data set to estimate the MCMC transition matrix $P=(p_{yx})_{yx}$ and in turn form a point estimate of δ (solid red line), then a random subsample of the data to compute 99% bootstrap confidence intervals (red error bands).

We focus on an n=10 model instance here in which the six lowest-E configurations are all local minima, and the two lowest have an energy difference of just $|\Delta E|=0.05$. For this instance, δ closely follows the average in FIG. 4 for the local and uniform proposal strategies, as well as for our quantum algorithm in theory, as shown in FIG. 8. We estimated δ as a function of T for the experimental realization of our quantum algorithm by counting quantum transitions $|x\rangle \rightarrow |y\rangle$ between all computational states $|x\rangle$ and $|y\rangle$ to estimate the MCMC transition matrix, which we then diagonalized. At low T, the inferred δ is smaller than the theoretical value due to experimental imperfections, but still significantly larger than that of either the local or uniform alternative. This constitutes an experimental quantum enhancement in MCMC convergence on current quantum hardware. At high T, the experimental δ is larger than the theoretical value for our quantum algorithm, which we attribute to noise in the quantum processor mimicking the uniform proposal to a degree. We also computed for common MCMC cluster algorithms (those of Swendsen-Wang, Wolff and Houdayer). These are substantially more complicated than the local and uniform proposals, both conceptually and practically, but offer almost no δ enhancement in this setting compared to the simpler classical alternatives, so we do not focus on them here.

To further illustrate the increased convergence rate of our quantum-enhanced MCMC algorithm compared to these classical alternatives, we use it to estimate the average magnetization (with respect to the Boltzmann distribution μ) of this same n=10 instance. The magnetization of a spin configuration x is $$m(x) = \frac{1}{n}\sum_{j=1}^{n} x_j$$

and the Boltzmann average magnetization is written as equation (13).

$$\langle m \rangle_\mu = \sum_s \mu_x m(x) \tag{13}$$

While Equation (13) involves a sum over all $2^n$ configurations, not all of them contribute equally, especially at low T. Rather, given r samples $\{z^{(1)}, z^{(2)}, \ldots, z^{(r)}\}$ from μ, the approximation $\langle m \rangle_\mu r^{-1}$ $$\sum_{i=1}^{r} m(z^{(i)})$$

can be accurate with high probability even if $r \ll 2^n$. While sampling from μ exactly may be infeasible, it is common to approximate $\langle m \rangle_\mu$ by the run average of m(x) over MCMC trajectories (of one or several independent chains), and likewise for other average quantities. The quality of this approximation after a fixed number of MCMC iterations reflects the Markov chains' convergence rate.

We used this approach to estimate $\langle m \rangle$, at T=0.1 as shown in FIGS. 9A and 9B. FIG. 9A is a plot of the current magnetization $m(x^{(j)})$ for individual Markov chains after j iterations, according to an embodiment of the present invention. Each chain illustrates a different proposal strategy with uniformly random initialization. Arrows indicate the magnetization of the ground (G), 1st, 2nd and 3rd excited configurations.

FIG. 9B is a plot of the magnetization showing the convergence of the running average $$\overline{m}^{(j)} = \frac{1}{j}\sum_{k=0}^{j} m(x^{(k)})$$

from MCMC trajectories to the true value of $\langle m \rangle_\mu$ for different proposal strategies, according to an embodiment of the present invention. For each strategy, the lines and error bands show the mean and standard deviation, respectively, of $\overline{m}^{(j)}$ over 10 independent chains. The inset depicts the same chains over more iterations. We do not use a burn-in period or thinning (i.e., the running average starts at k=0 and includes every iteration up to k as these practices would introduce hyperparameters that complicate the interpretation. Both FIG. 9A and FIG. 9B are for the same illustrative n=10 instance at T=0.1, and use the Metropolis-Hastings acceptance probability.

At this temperature $\langle m \rangle_\mu \approx 0.15$, and the Boltzmann probabilities of the ground (i.e., lowest-E), 1st, 2nd and 3rd excited configurations are approximately 43%, 26%, 19% and 12% respectively. This T is therefore sufficiently high that sampling from μ is not simply an optimization problem (where $\langle m \rangle_\mu$ depends overwhelmingly on the ground configuration), but sufficiently low that $\langle m \rangle_\mu$ is mostly determined by a few low-E configurations out of $2^n=1024$. Efficiently estimating $\langle m \rangle_\mu$ using MCMC therefore involves finding these configurations and jumping frequently between them in proportion to their Boltzmann probabilities. The magnetization m(x) for illustrative trajectories is shown in FIG. 9A for the local and uniform proposal strategies, and for an experimental implementation of our quantum algorithm. While each Markov chain finds a low-E configurations quickly, our quantum algorithm jumps between these configurations noticeably faster than the others. The running average estimate for $\langle m \rangle_\mu$ from 10 independent Markov chains of each type is shown in FIG. 9B. Our quantum algorithm converges to the true value of $\langle m \rangle_\mu$, with no discernible bias, substantially faster than the two classical alternatives despite experimental imperfections.

Finally, we examined the mechanism underlying this observed quantum speedup. The local proposal strategy typically achieves small $|\Delta E|=|E(y)-E(x)|$ by picking y from the neighbors of x, whereas the uniform proposal strategy typically picks y far from x at the cost of a larger ΔE, as illustrated in FIG. 6. Our quantum algorithm was motivated by the possibility of achieving the best of both: small $|\Delta E|$, and y far from x. This combination of features is illustrated in FIG. 6 and borne out in FIGS. 10A-10D.

FIG. 10A shows a classically-simulated probabilities of $x \rightarrow y$ proposals in our quantum algorithm, represented as a $2^n \times 2^n$ matrix $Q=(q_{yx})_{yx}$ whose columns are independent histograms, according to an embodiment of the present invention. Both the initial and proposed configurations are sorted by increasing Ising energy E. FIG. 10B shows the estimated proposal probabilities for our algorithm's experimental realization, according to an embodiment of the present invention. We estimated each $q_{yx}$ by the number of observed $x \rightarrow y$ proposals normalized by the number of x→[anything] proposals, using a total of $5.76\times10^7$ recorded quantum transitions. FIG. 10C shows the probability distributions of Hamming distance between current (x) and proposed (y) configurations, for a uniformly random current configuration, according to an embodiment of the present invention. The experiment uses the estimated probabilities from FIG. 10B, while the rest were computed exactly. FIG. 10D shows analogous distributions for $|\Delta E|=|E(y)-E(x)|$ of proposed jumps, according to an embodiment of the present invention. Each distribution is depicted in full detail through its cumulative distribution function, with no binning. FIGS. 10A, 10B, 10C and 10D are all for the same illustrative n=10 model instance. None depend on T or on the type of acceptance probability.

The proposal probabilities $q_{yx}$ arising in our algorithm for the same n=10 model instance are shown in FIGS. 10A and 10B for theory and experiment respectively. Both show the same effect with good qualitative agreement. Starting from x, our quantum algorithm mostly proposes jumps to configurations y for which $|\Delta E|$ is small, even though x and y may be far in Hamming distance. This effect is especially pronounced between the lowest-E configurations and also between highest-E ones.

To further examine this effect we asked: for a uniformly random configuration x, what is the probability of proposing a x→y jump for which x and y are separated by a Hamming distance d, or by an energy difference $|\Delta E|$? The resulting distributions are shown in FIGS. 10C and 10D respectively for the local and uniform proposal strategies, as well as for the theoretical and experimental realizations of our quantum algorithm. The Hamming distance distribution for local proposals is concentrated at d=1 (by definition), whereas it is much more evenly spread for both uniform proposals and for our quantum algorithm, as shown in FIG. 10C. Conversely, the ΔE distribution of local proposals is more concentrated at small ΔE than that of uniform proposals. In theory, the corresponding distribution for our quantum algorithm is even more strongly concentrated at small ΔE, as shown in FIG. 10D. The ΔE distribution from the experimental realization of our algorithm, however, lies between those of the local and uniform proposal strategies, due to experimental imperfections.

Current quantum computers can sample from complicated probability distributions. We proposed and experimentally demonstrated a new quantum algorithm which leverages this ability in order to sample from the low-temperature Boltzmann distribution of classical Ising models, which is useful in many applications. Our algorithm uses relatively simple and shallow quantum circuits, thus enabling a quantum speedup on current hardware despite experimental imperfections. It works by alternating between quantum and classical steps on a shot-by-shot basis, unlike variational quantum algorithms, which typically run a quantum circuit many times in each step. Rather, the methods according to various embodiments of the present invention use a quantum computer to propose a random bit-string, which is accepted or rejected by a classical computer. The resulting Markov chain is guaranteed to converge to the desired Boltzmann distribution, which in many complex instances may not be possible to efficiently simulate classically. In this sense, many of the presently described methods according to embodiments of the present invention are partially heuristic, the eventual result is theoretically guaranteed, while fast convergence is established empirically.

Many state-of-the-art MCMC algorithms build upon simpler Markov chains in heuristically-motivated ways. For instance, by running several local Metropolis-Hastings chains in parallel at different temperatures and occasionally swapping them. Our quantum-based method(s) may provide a powerful new ingredient for such composite algorithms in the near term. We contemplate to provide a more targeted method of picking the parameters θ and t could further accelerate convergence. Indeed, t did not depend on the problem size n in our implementation, although in some settings it should grow with n if the qubits are all to remain within each others' light cones. Moreover, different quantum processors with different connectivities, such as quantum annealers, may also be well-suited to implement our algorithm, perhaps without needing to discretize the Hamiltonian dynamics in Step 1.

Our algorithm is remarkably robust against imperfections. It achieves a speedup by proposing good jumps. But not every jump needs to be especially good for the algorithm to work well. For instance, if an error occurs (for example due to noise) in the quantum processor while a jump is being proposed, the proposal will be accepted/rejected as usual, and the Markov chain can still converge to the target distribution provided such errors do not break the $q_{yx}=q_{xy}$ symmetry. Rather than produce the wrong result, we found that such errors merely slow the convergence slightly at low T. Our simulations suggest that the quantum speedup increases with the problem size n. However, we also expect the quantum noise to increase with n, in the absence of error correction, as the number of potential errors grows. The combined effect of these competing factors at larger n is currently unknown. It is interesting to note, however, that the cubic/quartic speedup we observed, should it persist at larger n, might give a quantum advantage on a small fault-tolerant quantum computer despite the error correction overhead.

Characterizing our algorithm at larger scales will require different methods than those employed here. For instance, a Markov chain's absolute spectral gap is a broad and unambiguous figure of merit, but it is not feasible to measure for large instances. This not an issue with our quantum algorithm in particular, but rather, with MCMC in general. Instead, a more fruitful approach may be to focus directly on how well our algorithm performs in various applications, such as in simulated annealing (for combinatorial optimization), for estimating thermal averages in many-body physics models, or for training and sampling from (classical) Boltzmann machines for machine learning applications.

The present method and system can be used in various applications including training and sampling from Boltzmann machines. Boltzmann machines are machine learning models that are often constrained by computational bottlenecks that the present method, according to embodiments of the invention, could ease. They have a number of possible applications within machine learning, including generative modelling, classification, and feature extraction.

The present method and system can also be used in combinatorial optimization. The present method can also be used for finding the ground state of Ising models as part of a simulated annealing car parallel tempering algorithm (optimization).

The present method and system can also be used in statistical physics to compute thermal averages in statistical physics models. For example, the Ising model was initially proposed as a model of magnetism in materials and the present method and system could provide results faster.

Generally, to interact with a quantum computer such as quantum computer 204, a classical computer such as classical computer 202 is used. The classical or conventional computer provides inputs and receives outputs from the quantum computer. The inputs may include instructions included as part of the code. The outputs may include quantum data results of a computation of the code on the quantum computer. In the present case, the classical computer that may be used to interact with the quantum computer 102 can be the classical computer 104 or a different classical computer.

The classical computer interfaces with the quantum computer via a quantum computer input interface and a quantum computer output interface. The classical computer sends commands or instructions included within the code to the quantum computer system via the input and the quantum computer returns outputs results of the quantum computation of the code to the classical computer via the output. The classical computer can communicate with the quantum computer wirelessly or via the internet. In an embodiment, the quantum computer can be a quantum computer simulator simulated on a classical computer. For example, the quantum computer simulating the quantum computing simulator can be one and the same as the classical computer. In another embodiment, the quantum computer is a superconducting quantum computer. In an embodiment, the superconducting quantum computer includes one or more quantum circuits (Q chips), each quantum circuit includes a plurality of qubits, one or more quantum gates, entanglement gates, measurement devices, etc.

In an embodiment, the code may be stored in a computer program product which include a computer readable medium or storage medium or media. Examples of suitable storage medium or media include any type of disk including floppy disks, optical disks, DVDs, CD ROMs, magnetic optical disks, RAMS, EPROMs, EEPROMs, magnetic or optical cards, hard disk, flash card (e.g., a USB flash card), PCMCIA memory card, smart card, or other media. In another embodiment, the code can be downloaded from a remote conventional or classical computer or server via a network such as the Internet, an ATM network, a wide area network (WAN) or a local area network. In yet another embodiment, the code can reside in the "cloud" on a server platform, for example. In some embodiments, the code can be embodied as program products in the conventional or classical computer such as a personal computer or server or in a distributed computing environment comprising a plurality of computers that interacts with the quantum computer by sending instructions to and receiving data from the quantum computer.

The code may be stored as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" or "code" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of sampling from a probability distribution approximating a Boltzmann distribution of an n-spin Ising model, comprising:

selecting, by a classical computer, a first n-spin configuration of n ordered spins associated with the n-spin Ising model;

preparing, by a quantum computer, a first n-qubit state that is associated with said selected first n-spin configuration, wherein each n-qubit state is associated with a unique one n-spin configuration of said n ordered spins, and the first n-qubit state is a computational-basis state $|x\rangle$ encoding a classical n-bit string x;

applying, by the quantum computer, a unitary operator to the first n-qubit state resulting in an evolved second n-qubit state, the unitary operator being part of a quantum channel $C_E$ acting on computational-basis states and defining, for each pair of classical n-bit strings x and y, a proposal probability $q_{yx}$, wherein $q_{yx}$ is defined as a probability that, when the quantum channel $C_E$ is applied to the first n-qubit state $|x\rangle\langle x|$ and a resulting second n-qubit state is measured in a quantum computational basis, a measurement result is the classical n-bit string y, and wherein the quantum channel $C_E$ satisfies $q_{yx}=q_{xy}$ for all classical n-bit strings x and y;

measuring, by the quantum computer, the evolved second n-qubit state to identify a corresponding second n-spin configuration represented by a classical n-bit string y; and calculating, by the classical computer, an acceptance probability $A_{yx}$ to determine whether to replace the selected first n-spin configuration represented by x with the second n-spin configuration represented by y corresponding to said evolved second n-qubit state or whether to keep the selected first n-spin configuration unmodified by the applying the unitary operator to obtain an output n-spin configuration, wherein the acceptance probability $A_{yx}$ depends on the n-spin Ising model and not on any explicit numerical value of the proposal probabilities $q_{yx}$ or $q_{xy}$ defined by the quantum channel $C_E$.

2. The method of claim 1, further comprising repeating the preparing, the applying, the measuring, and the calculating until said output n-spin configuration is sufficiently close to the Boltzmann distribution of said n-spin Ising model according to a defined criterion.

3. The method of claim 2, further comprising receiving, by the classical computer, coupling coefficients for spin-spin interactions between spins pairs of the n ordered spins, field coefficients local to each spin, and a temperature for said n-spin Ising model, said n-spin Ising model having an energy associated with each configuration of n ordered spins.

4. The method of claim 2, wherein repeating the preparing, the applying, the measuring and the calculating comprises:

preparing another n-qubit state on the quantum computer, wherein each n-qubit state is associated with the unique one n-spin configuration of said n ordered spins;

applying the unitary operator, by the quantum computer, to said another n-qubit state resulting in another evolved n-qubit state;

measuring, by the quantum computer, said another evolved n-qubit state to identify a corresponding one of said n-spin configurations; and calculating, on the classical computer, an acceptance probability to determine whether to replace said another n-spin configuration with the n-spin configuration corresponding to said another evolved n-qubit state or whether to keep said another n-spin configuration unmodified by the applying the unitary operator to obtain the output n-spin configuration.

5. The method of claim 1, wherein the Boltzmann distribution of the n-spin Ising model is defined by a temperature T, a function $$E(x)--\sum_{k>j=1}^{n} J_{jk}x_jx_k - \sum_{j=1}^{n} h_jx_j$$

that assigns an energy value to every n-bit state $x=(\pm1, \ldots, \pm1)$ where $J_{jk}$ and $h_j$ are coupling coefficients and field coefficients respectively, and where the Boltzmann distribution assigns a probability $$Z^{-1}e^{-\frac{E(x)}{T}}$$

to each n-bit state x where Z=is a normalizing coefficient.

6. The method of claim 5, wherein the quantum channel $C_E$ defines the proposal probability $q_{yx}$ of proposing the evolved second n-qubit state in the quantum computational basis y starting with the first n-qubit state encoding the classical n-bit string x in the quantum computational basis that is equal to a proposal probability $q_{xy}$ of proposing the first n-qubit state in the quantum computational basis starting with the evolved second n-qubit state encoding the classical n-bit string y in the quantum computational basis, such that a ratio of the proposal probability $q_{yx}$ to the proposal probability $q_{xy}$ is equal to one.

7. The method of claim 6, wherein the acceptance probability $A_{yx}$ depends on the ratio of the proposal probability $q_{yx}$ to the proposal probability $q_{xy}$.

8. The method of claim 7, further comprising implementing, by the quantum computer, the quantum channel $C_E$ using Hamiltonian dynamics through an analog or a digital quantum simulation which defines the proposal probability $q_{yx}$ and the proposal probability $q_{xy}$.

9. The method of claim 8, wherein using the Hamiltonian dynamics comprises evolving a quantum state by a Hamiltonian $H(\theta)=(1-\theta)\alpha H_E+\theta H_{mix}$, for θ selected within an interval from zero to one and an arbitrary scaling parameter α, wherein:

$$H_E = \sum_x E(x)|x\rangle\langle x| = -\sum_{k>j=1}^{n} J_{jk}Z_jZ_k - \sum_{j=1}^{n} h_jZ_j$$

which depends on specified parameters $\{J_{jk}\}$, $\{h_j\}$, wherein $\{J_{jk}\}$, $\{h_j\}$ are, respectively, the coupling coefficients and field coefficients, wherein $Z_j$ and $Z_k$ are respectively Pauli $\sigma_z$ (sigma-z) matrices on qubits j and k, and $H_{mix}\Sigma_P c_P$, where $c_P$ are arbitrary real numbers and each P, is a matrix from the set formed by arbitrary products of one or more of $X_j$ or $Y_jY_k$, where $X_j$ is a Pauli $\sigma_x$ (sigma-x) matrix on qubit j, and where $Y_j$ and $Y_k$ are Pauli $\sigma_y$ (sigma-y) matrices on qubits j and k respectively, so that $(y|H_{mix}|x)\in\mathbb{R}$ for all n-bit states x and y.

10. The method of claim 9, wherein using the Hamiltonian dynamics further comprises applying an evolution by the Hamiltonian H(θ) with time t for fixed values of θ.

11. The method of claim 10, wherein calculating the acceptance probability $A_{yx}$ comprises calculating the acceptance probability $A_{yx}$ using a same value θ and different times t.

12. The method of claim 7, wherein calculating the acceptance probability $A_{yx}$ comprises calculating the acceptance probability $A_{yx}$ using different values θ and different times t selected at random for each jump between spin configurations from pre-determined distributions.

13. The method of claim 7, wherein calculating the acceptance probability $A_{yx}$ comprises calculating coefficients $\alpha_{yx}$ wherein $$\alpha_{yx} = \frac{e^{\frac{[E(x)-E(y)]}{T}}q_{xy}}{q_{yx}} = e^{\frac{[E(x)-E(y)]}{T}},$$

wherein the acceptance probability $A_{yx}$ satisfies $1\geq A_{yx}=\alpha_{yx}A_{xy}>0$ to guarantee detailed balance, for instance $A_{yx}=\min(1, \alpha_{yx})$ which gives a Metropolis-Hastings algorithm, or $$A_{yx} = \left(1 + \frac{1}{\alpha_{yx}}\right)^{-1}$$

which gives a Glauber dynamics/Gibbs sampler algorithm, wherein E(x) corresponds to an energy value in the n-spin Ising model of the first n-qubit state x and E(y) corresponds to an energy value in the n-spin Ising model of the evolved second n-qubit state y, and T corresponds to the temperature.

14. The method of claim 8, wherein using the Hamiltonian dynamics comprises performing a quantum measurement in an eigenbasis of the Hamiltonian H(θ) for fixed values of θ.

15. The method of claim 14, wherein performing the quantum measurement in the eigenbasis of the Hamiltonian H(θ) for fixed values of 0 comprises performing a quantum phase estimation algorithm on the quantum computer using controlled exp[=i H(θ)τ]-like gates through the analog or the digital quantum simulation, wherein τ represents time.

16. The method of claim 8, wherein using the Hamiltonian dynamics comprises applying a nearly-adiabatic evolution by the Hamiltonian H(θ) with time varying θ.

17. The method of claim 14, wherein applying the nearly-adiabatic evolution by the Hamiltonian H(θ) with time varying θ comprises applying the nearly-adiabatic evolution by the Hamiltonian H(θ) using a reverse quantum annealing procedure, wherein θ initially equals 0 and is slowly increased to some value of at most 1, then slowly decreased back to 0 in a symmetric manner.

18. A system for sampling from a probability distribution approximating a Boltzmann distribution of an n-spin Ising model, the system comprising:

a classical computer; and a quantum computer, wherein the classical computer is configured to select a first n-spin configuration of n ordered spins associated with the n-spin Ising model;

wherein the quantum computer is configured to:

prepare a first n-qubit state that is associated with said selected first n-spin configuration, wherein each n-qubit state is associated with a unique one n-spin configuration of said n ordered spins, and the first n-qubit state is a computational-basis state $|x\rangle$ encoding a classical n-bit string x, apply a unitary operator to the first n-qubit state resulting in an evolved second n-qubit state, the unitary operator being part of a quantum channel $C_E$ acting on computational-basis states and defining, for each pair of classical n-bit strings x and y, a proposal probability $q_{yx}$, wherein $q_{yx}$ is defined as a probability that, when the quantum channel $C_E$ is applied to the first n-qubit state $|x\rangle\langle x|$ and a resulting second n-qubit state is measured in a quantum computational basis, a measurement result is the classical n-bit string y, and wherein the quantum channel $C_E$ satisfies $q_{yx}=q_{xy}$ for all classical n-bit strings x and y, and measure the evolved second n-qubit state to identify a corresponding second n-spin configuration represented by a classical n-bit string y; and wherein the classical computer is further configured to calculating, an acceptance probability $A_{yx}$ to determine whether to replace the selected first n-spin configuration represented by x with the second n-spin configuration represented by y corresponding to said evolved second n-qubit state or whether to keep the selected first n-spin configuration unmodified by the applying the unitary operator to obtain an output n-spin configuration, wherein the acceptance probability $A_{yx}$ depends on the n-spin Ising model and not on any explicit numerical value of the proposal probabilities $q_{yx}$ or $q_{xy}$ defined by the quantum channel $C_E$.

19. The system of claim 18, wherein the system is configured to repeat the preparing, the applying, the measuring, and the calculating until said output n-spin configuration is sufficiently close to the Boltzmann distribution of said n-spin Ising model.

20. The system of claim 18, wherein the classical computer is further configured to receive coupling coefficients for spin-spin interactions between spins pairs of the n ordered spins, field coefficients local to each spin, and a temperature for said n-spin Ising model, said n-spin Ising model having an energy associated with each configuration of n ordered spins.

* * * * *